United States Patent [19]

Suzuki et al.

[11] Patent Number: 5,221,467
[45] Date of Patent: Jun. 22, 1993

[54] CONTAMINATED SOLUTION FILTRATION APPARATUS AND MACHINING SOLUTION FILTRATION APPARATUS FOR MACHINING DEVICE

[75] Inventors: Toshio Suzuki; Takeshi Yatomi; Toshihiro Nagasaka, all of Aichi, Japan

[73] Assignee: Mitsubishi Denki K.K., Tokyo, Japan

[21] Appl. No.: 705,045

[22] Filed: May 24, 1991

[30] Foreign Application Priority Data

May 30, 1990 [JP] Japan ................... 2-138324
Nov. 16, 1990 [JP] Japan ................... 2-308742

[51] Int. Cl.⁵ .................. B01D 17/12; B01D 19/00; B01D 36/02
[52] U.S. Cl. .................. 210/85; 210/90; 210/94; 210/96.1; 210/102; 210/103; 210/134; 210/143; 210/188; 210/335; 210/341; 210/387; 210/406; 210/487; 219/69.14
[58] Field of Search ............ 210/85, 90, 91, 94, 210/96.1, 97, 102, 103, 134, 138, 143, 188, 167, 257.1, 259, 340, 341, 400, 401, 406, 487, 497.01, 739, 741, 387, 416.1; 219/69.14, 69.11

[56] References Cited

U.S. PATENT DOCUMENTS

| | | | |
|---|---|---|---|
| 3,087,620 | 3/1963 | Hirs | 210/401 |
| 3,338,412 | 8/1967 | Fehlmann | 210/400 |
| 3,506,128 | 4/1970 | Pashaian et al. | 210/400 |
| 3,631,982 | 1/1972 | Lejeune | 210/400 |
| 3,678,240 | 7/1972 | Dietrick | 219/69.14 |
| 3,741,865 | 6/1973 | Lejeune | 210/400 |
| 3,878,352 | 4/1975 | Inoue | 219/69.14 |
| 4,145,288 | 3/1979 | Crowe | 210/401 |
| 4,584,450 | 4/1986 | Inoue | 210/685 |
| 4,612,123 | 9/1986 | Eustacchio et al. | 210/96.1 |
| 4,990,251 | 2/1991 | Ho | 210/96.1 |
| 5,021,166 | 6/1991 | Torpey | 210/143 |
| 5,071,567 | 12/1991 | Corcelle et al. | 210/143 |

FOREIGN PATENT DOCUMENTS

| | | | |
|---|---|---|---|
| 58-59737 | 4/1983 | Japan | 219/69.14 |
| 59-73234 | 4/1984 | Japan | 219/69.14 |
| 59-97816 | 6/1984 | Japan | 219/69.14 |
| 61-219533 | 9/1986 | Japan | 219/69.14 |
| 63-34023 | 2/1988 | Japan | 219/69.14 |

*Primary Examiner*—Joseph W. Drodge
*Attorney, Agent, or Firm*—Sughrue, Mion, Zinn, Macpeak & Seas

[57] ABSTRACT

A machining solution filtration apparatus for a machining device which includes: a filter, a filter medium which is arranged separately from the filter and supplied continuously; a unit for supplying a contaminated machining solution to the filter medium; a unit for generating a difference in pressure between the upper surface and lower surface of the filter medium; a unit for returning a machining solution filtered via the pressure difference to a filtered solution vessel; a unit for selecting the filter to allow the machining solution to be filtered only thereby for a predetermined period of time; a unit for detecting the presence/absence and/or remaining amount of the filter medium; and a unit for controlling the speed of supplying the filter medium. Accordingly, the apparatus is not only simple in structure and efficient in filtration, but also capable of reducing its running cost by extending the life of the filter and improving utilization of the machining device by reducing the frequency of replacing the filter. It is also easy in maintenance and readily repairable in the event of an abnormality.

22 Claims, 18 Drawing Sheets

CONTAMINATED SOLUTION FILTRATION APPARATUS AND MACHINING SOLUTION FILTRATION APPARATUS FOR MACHINING DEVICE

BACKGROUND OF THE INVENTION

The invention relates to contaminated solution filtration apparatuses and machining solution filtration apparatuses for machining devices. More particularly, it is directed to a contaminated solution filtering apparatus and a machining solution filtration apparatus for a machining device which are not only capable of extending the life of a filter medium, thereby reducing the running cost of their filter devices, but also increasing the utilization of the machining device and facilitating maintenance.

FIG. 16 is a diagram showing a construction of an exemplary conventional apparatus for filtering a machining solution for a wire cut type electric charge machining device; FIG. 17 (a) is a partially sectional diagram showing a construction of a machining solution filter thereof; and FIG. 17 (b) is a plan view thereof. In FIGS. 16 and 17, reference numeral (1) designates a wire electrode; (2), a workpiece; (3), a machining vessel of the electric discharge machining device; (4), a machining solution filtration unit including a contaminated solution vessel for depositing a contaminated machining solution and a cleaning vessel for storing a clean machining solution that has been filtered; (7), a machining solution filter disposed within the cleaning vessel (6), the machining solution filter (7) communicating with the contaminated solution vessel (5) through a pipe (8); (9), a filter pump disposed in the pipe (8); (10), a pressure gauge for detecting a pressure within the machining solution filter (7); (11), (12), machining solution nozzles of the electric discharge machining device disposed so as to confront each other, both nozzles communicating with the cleaning vessel (6) through a pipe (13). The pipe (13) is provided with a supply pump (14).

FIGS. 17 (a) and (b) show a detailed construction of the machining solution filter (7). As disclosed in, e.g., Japanese Patent Unexamined Publication No. 73234/1984, the machining solution filter (7) has such a structure that a filter medium (18) is interposed between double-tubularly arranged perforated metal housings (15) (16) having a multiplicity of machining solution passing holes (17) on their sidewall surfaces; and that the upper and lower ends of the filter medium are interposed between plates (19), (20), each of which has a hole at its center. This machining solution filter (7) has the holes of the plates (19), (20) inserted by a cylindrical shaft (21) having a multiplicity of small holes (22) on the sidewall surface; sealed by packinqs (23), (23a); and fixed on a shaft fixing stand (25) by a nut (24). The cylindrical shaft (21) is connected to the pipe (8), while the machining solution filter (7) is usually located inside the cleaning vessel (6) and immersed into a clean machining solution.

An operation of the wire-rod electric discharge machining device having such machining solution filter device will now be described. The wire-rod electric discharge machining device machines the workpiece (2) using electric discharge energy generated by applying a voltage between the wire electrode (1) that has been inserted into a machining hole of the workpiece (2) and the workpiece (2) thereby to initiate discharge while supplying a machining solution therebetween (into the interelectrode gap) from the machining solution nozzles (11), (12). Machining scraps, which are substantially spherical being about several μm or several tens of μm in size, are produced during machining. Since the machining scraps lead to provoke unstable machining such as secondary discharge or concentrated discharge, or breakage of the wire electrode (1), the machining solution to be supplied between the wire electrode and the workpiece must be clean to stabilize the machining.

The machining solution sent from the cleaning vessel (6) to the machining solution nozzles (11), (12) through the pipe (13) by the supply pump (14) and then supplied to the interelectrode gap is thereafter received by the machining vessel (3) in the form of a contaminated machining solution containing machining scraps, discharged from a discharge pipe (3a), and fed back to the contaminated solution vessel (5) of the machining solution filtration unit (4). The contaminated machining solution is sent from the contaminated solution vessel (5) to the machining solution filter (7) by the filter pump (9) under pressure, introduced into the filter medium (18) while passing first through the small holes (22) of the cylindrical shaft (21) and then through the machining solution passing holes (17) of the inner perforated metal housing (15), filtered by the filter medium (18), discharged from the machining solution passing holes (17) of the outer perforated metal housing (16), and stored in the cleaning vessel (6). And the cleaned machining solution in the cleaning vessel (6) is supplied again to the interelectrode gap by the supply pump (14). Thus, this is how the machining solution is recycled. Since the volume of the machining solution supplied to the interelectrode gap is usually smaller than the volume of the machining solution filtered by the machining solution filter (7), the clean machining solution stored in the cleaning vessel (6) overflows into the contaminated solution vessel (5).

If the filter medium (18) is clogged and, as a result, the pressure within the machining solution filter (7) is so elevated as to exceed the tensile strength of the filter medium (18), then the filter medium (18) will be broken. For this reason, the pressure within the machining solution filter (7) is monitored by the pressure gauge (10) so that the filter medium (18) can be replaced at a predetermined pressure.

The conventional machining solution filtration apparatus for an electric discharge machining device is constructed as described above. In such an apparatus, the contaminated machining solution containing machining scraps whose size is relatively large is sent to the machining solution filter (7), thereby making the filter medium (18) susceptible to early clogging. Frequent clogging of the filter medium demands frequent replacement, thereby imposing the problem of raising the running cost. The replacement of a filter medium (18) requires extraction of the machining solution filter (7) which is immersed into the cleaning solution vessel (6), thereby not only splashing the machining solution but also blending the contaminated machining solution with the solution in the cleaning vessel (6). This suspends the machining until the cleaning vessel (6) is cleaned and keeps the machining device operative only for filtering, thereby imposing the problem of considerably reducing the utilization of the electric discharge machining device.

To overcome the above problems, i.e., to extend the life of the filter medium, a sedimentation tank (5a) communicating with the contaminated vessel (5) is arranged adjacent thereto as shown in FIG. 18. The contaminated machining solution from the machining vessel (3) is first held in the sedimentation tank (5a) to have its machining debris deposited therein and then sent to the contaminated solution vessel (5) (see Japanese Patent Unexamined Publication No. 73235/1984).

However, such an apparatus allows the large-sized machining scraps to be deposited relatively well, thus contributing to extending the life of the filter medium (18). However, this advantage will eventually be reduced to nothing unless the deposited machining scraps are removed periodically. Since the machining solution and its debris must be treated as industrial wastes, they cannot be drained into the sewage or the like. In addition, these wastes contain a large volume of water, thereby imposing another problem of being difficult in maintenance and handling. Furthermore, removal of the contaminated machining solution within the sedimentation tank (5a) takes the machining solution away therefrom in a volume corresponding to what has been removed, thereby requiring its replenishment. This not only elevates the running cost but also complicates the management of the specific resistance of the machining solution in case of the wire-rod electric discharge machining device.

The invention has been made to overcome the above circumstances. Accordingly, an object of the invention is to provide a contaminated solution filtration apparatus, which is simple in structure and efficient in filtration, and a machining solution filtration apparatus for a machining device which is not only capable of reducing its running cost by extending the life of a machining solution filter and improving utilization of the machining device by reducing machining solution filter replacements, but also easy in maintenance and readily repairable in the event of an abnormality.

SUMMARY OF THE INVENTION

To achieve the above object, the invention is applied to a contaminated solution filtration apparatus such as:

(1) a filtration apparatus for filtering and recycling a contaminated solution, which comprises: a sheet-like filter medium which is continuously supplied; means for supplying the contaminated solution to the filter medium; and means for generating a difference in pressure between the upper surface and lower surface of the filter medium;

(2) a filtration apparatus for filtering and recycling a contaminated solution with a filter arranged in a filtration unit, which comprises: a sheet-like filter medium which is arranged separately from the filter and supplied continuously; means for supplying the contaminated solution to the filter medium; means for generating a difference in pressure between the upper surface and lower surface of the filter medium; and means for selecting the filter to allow the contaminated solution to be filtered only thereby for a predetermined period of time;

and in the apparatuses described in the above items (1) and (2), (3) means for detecting the presence/absence and/or remaining amount of the filter medium is provided; and (4) means for controlling the speed of supplying the filter medium is provided.

To achieve the object, the invention is also applied to a machining solution filtration apparatus for a machining device such as:

(1) a machining solution filtration apparatus for a machining device for filtering and recycling a contaminated machining solution produced by machining a workpiece, which comprises: a sheet-like filter medium which is supplied continuously; means for supplying the contaminated machining solution to the filter medium; means for generating a difference in pressure between the upper surface and lower surface of the filter medium; and means for returning a machining solution filtered by means of the pressure difference to a filtered solution vessel;

and in the apparatus described in the above item (1), (2) the contaminated machining solution supplying means introduces a contaminated machining solution from the machining device;

(3) the contaminated machining solution supplying means introduces a contaminated machining solution which has been discharged from the machining device to the contaminated machining solution tank;

(4) the contaminated machining solution supplying means further includes a path for supplying a contaminated machining solution from the machining device, a path for discharging the contaminated machining solution to the contaminated machining solution tank, and means for switching these paths; and further, (5) a machining solution filtration apparatus for a machining device for filtering and recycling a contaminated machining solution produced by machining a workpiece using a filter arranged in a filtration unit, which comprises: a sheet-like filter medium which is arranged separately from the filter and supplied continuously; means for supplying the contaminated machining solution to the filter medium; means for generating a difference in pressure between the upper surface and lower surface of the filter medium; means for returning a machining solution filtered by means of the pressure difference to a filtered solution vessel; and means for selecting the filter to allow the machining solution to be filtered only thereby for a predetermined period of time;

and in the apparatuses described in the above items (1) to (5), (6) means for detecting the presence/absence and/or remaining amount of the filter medium is provided; and (7) means for controlling the speed of supplying the filter medium is provided.

In the contaminated solution filtration apparatus of the invention, the contaminated solution supplied to the filter medium by the contaminated solution supplying means passes through the filter medium by a pressure difference generated between the upper surface and lower surface of the filter medium. At this moment, any foreign matter contained in the filtered solution is entrapped by the filter medium so that the solution is processed to be a clean solution.

Since the filter medium is supplied continuously, stable filtering can be ensured at all times.

The provision of a filter in the filtration unit not only contributes to extending the life of the filter itself but also allowing the filter to be precoated through filtration of the contaminated solution only with the filter while suspending the filtration with the filter medium for a predetermined period of time.

The detection of the presence/absence or remaining amount of the filter medium or the control of the filter medium supplying speed allows the contaminated solution to be filtered under an efficient supply of the filter medium.

Further, in the machining solution filtration apparatus for a machining device of the invention, the contaminated machining solution supplied from the machining device or contaminated machining solution tank by the machining solution supplying means causes the sheet-like filter medium to entrap the machining scraps and has the filtered machining solution having passed through the filter medium sent to the cleaning vessel or contaminated machining solution tank.

The provision of a filter in the filtration unit allows the filter to be precoated through filtration of the contaminated solution only with the filter while suspending the filtration with the filter medium for a predetermined period of time.

The provision of the path for supplying the contaminated machining solution to the filter medium, the path for discharging the contaminated machining solution to the contaminated machining solution tank, and the means for switching these paths allows supply of the contaminated machining solution to the filter medium to be suspended in the event that a large volume of contaminated machining solution is discharged from the machining device, or that the filter medium runs out, or in the event of an abnormality in the pressure difference generating means, by selecting the contaminated machining solution tank with the switching means.

The detection of the presence/absence or remaining amount of the filter medium or the control of the filter medium supplying speed allows the contaminated solution to be filtered under an efficient supply of the filter medium.

BRIEF DESCRIPTION OF THE DRAWINGS

FIG. 2 (b) is a plan view showing a main portion thereof;

FIG. 3 (b) is a plan view showing a main portion thereof;

FIG. 4 (b) is a plan view showing a main portion thereof;

FIG. 6 (b) is a plan view showing a main portion thereof;

FIG. 7 (b) is a plan view showing a main portion thereof;

FIG. 8 (b) is a plan view showing a main portion thereof;

FIG. 9 (b) is a plan view showing a main portion thereof;

FIG. 10 (b) is a plan view showing a main portion thereof;

FIG. 11 (b) is a plan view showing a main portion thereof;

FIG. 12 (b) is a plan view showing a main portion thereof;

FIG. 13 (b) is a plan view showing a main portion thereof;

FIG. 14 (b) is a plan view showing a main portion thereof;

FIG. 15 (b) is a plan view showing a main portion thereof;

FIG. 17 (b) is a plan view thereof; and

DETAILED DESCRIPTION OF THE PREFERRED EMBODIMENTS

Figure 1A:
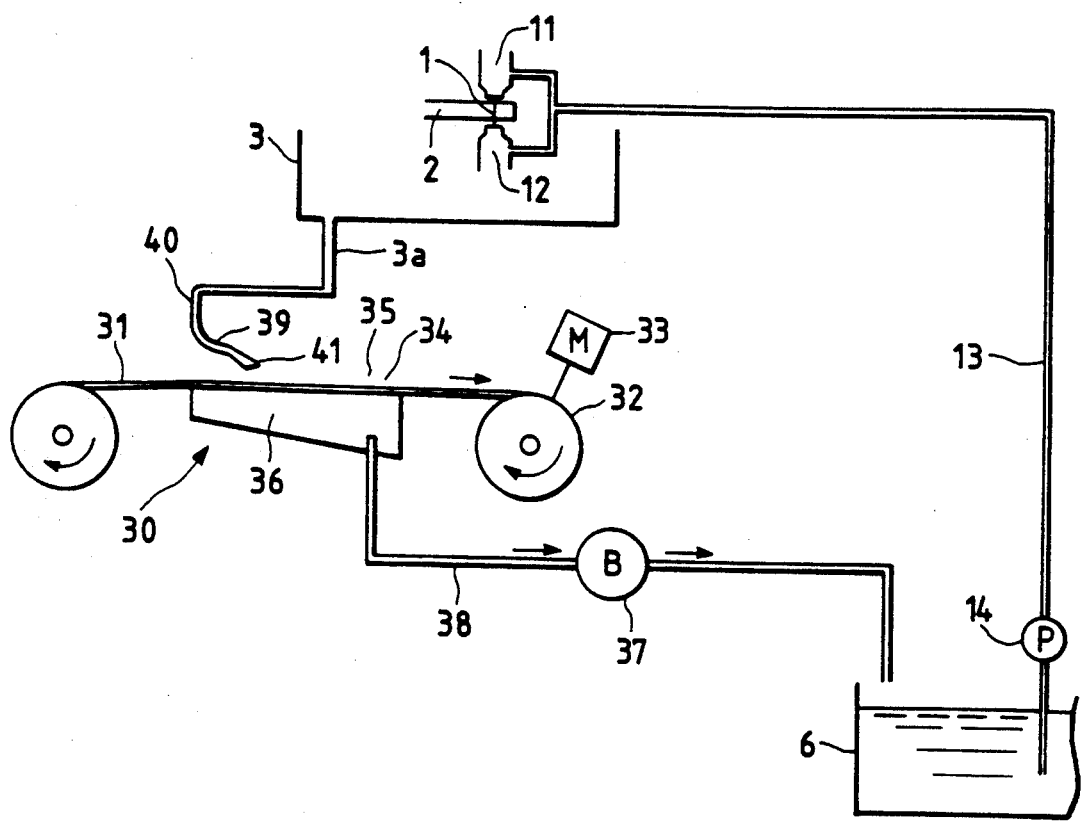
FIG. 1(a) is a diagram showing a construction of a first embodiment of the invention.
Figure 1B:
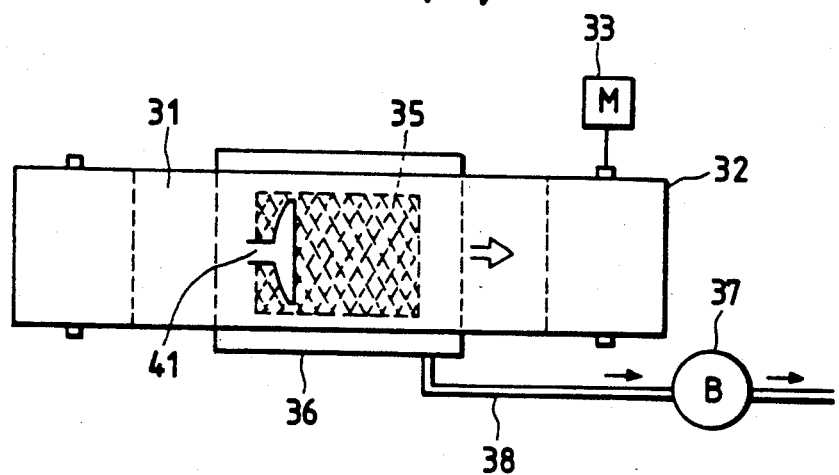
FIG. 1 (b) is a plan view showing a main portion thereof.

FIG. 1 (a) is a diagram showing a construction of a first embodiment of the invention; and FIG. 15 (b) is a plan view showing a main portion thereof. The same reference numerals designate the same parts as in the conventional example described with reference to FIG. 16, and the descriptions thereof will be omitted.

In FIGS. 1 (a) and (b), reference numeral (30) designates a filtration device; (31), a sheet-like filter medium which is made of filter paper or unwoven fabric and set at a supplying section while wound in the form of a roll; (32), a rewind roll, driven by a motor (33), for rewinding the filter medium (31) which has passed through a sucking section (34); (36), a box disposed below the sucking section (34) and having an upper meshed surface (35). The filter medium (31) is forwarded while in contact with the meshed surface (35). Reference numeral (37) designates a blower connected to the box (36) and mounted on a pipe (38) which has an outlet over a clean solution vessel (6). For example, a Nash blower capable of sucking both liquids and gases is employed in this embodiment. The motor (33) for driving the rewind roll (32) and the blower (37) are interlocked with a supply pump (14).

A contaminated machining solution supply device (39) includes: a hose (40) which is connected to a discharge pipe (3a) of a machining vessel (3); and a scattering device (41) for scattering the contaminated machining solution over the filter medium (31).

An operation of the thus constructed embodiment of the invention will be described next. When a machining solution has been supplied between an electrode and a workpiece upon start of a machining process, the motor (33) is driven to rewind the filter medium (31) around the rewind roll (32), causing the filter medium to move along the meshed surface (35) of the sucking section (34) at a predetermined speed. In the meantime, the blower (37) also starts operating. The machining solution which contains machining scraps produced in the interelectrode gap by the machining operation is guided to the hose (40) via the discharge pipe (3a) from the machining vessel (3), and scattered by the scattering device and discharged to the meshed surface (35). Since the inside of the box (36) disposed below the meshed surface (35) is negatively pressurized by the blower (37), the contaminated machining solution is sucked into the box (36) through the filter medium (31) together with air. At this time, the machining scraps among those contained in the contaminated machining solution which are larger in size than the mesh of the filter medium (31) do not pass therethrough, thereby being entrapped by the filter medium (31). The filter medium (31) is not subjected to clogging because it moves while being rewound at a predetermined speed. This ensures that stable filtration can be performed under the same condition at all times.

The filtered machining solution whose machining scraps have been removed by the filter medium (31) is recycled to be a clean machining solution containing few machining scraps and returned to a clean solution vessel (6) by the blower (37).

The used filter medium (31) rewound around the rewind roll (32), which contains few liquid components after having been sucked by the blower (37), can be treated with extreme ease. Use of an inflammable filter medium (31) will allow the filter medium to be incinerated.

Although the case where the machining solution filtered by the filtration device (30) is returned to the clean solution vessel (6) has been described above; if the volume of the machining scraps is large as in the case of roughing a workpiece, the filtered machining solution becomes clean with the bulk of the machining scraps entrapped by the filter medium (31), thereby imposing no problem. However, in the case of finishing the workpiece, the machining scraps cannot, in some cases, be entrapped by the filter medium (31) sufficiently. In such a case, the machining solution filtered by the filtration device (30) may be supplied to the filter (7) of the machining solution filtration unit (4) shown in FIG. 16 and further filtered by this filter (7).

Figure 2A:
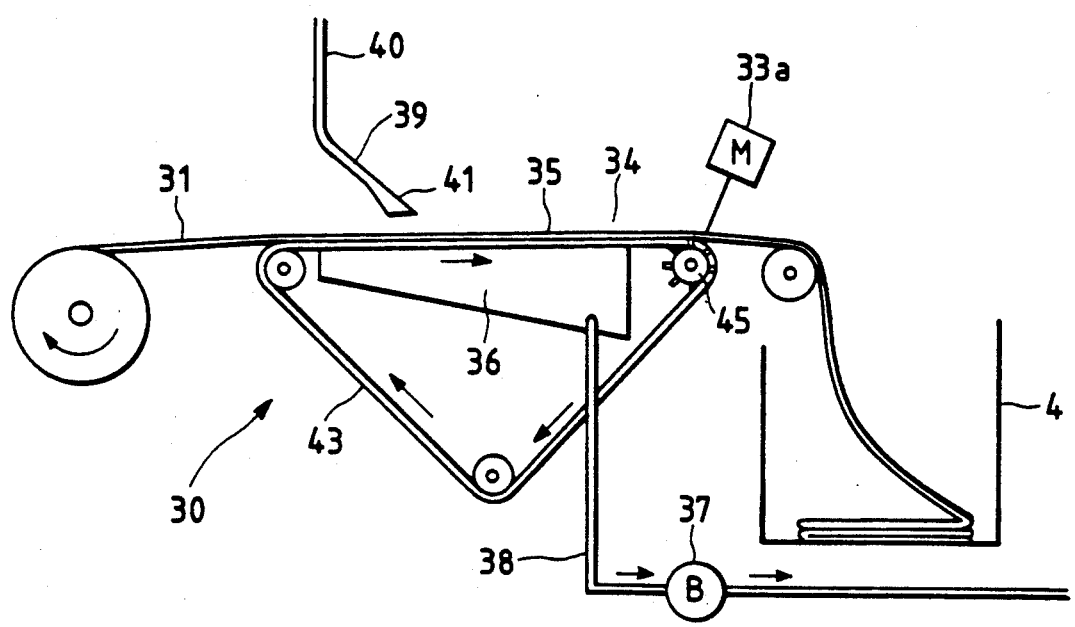
FIG. 2 (a) is a diagram showing a construction of a second embodiment of the invention.
Figure 2B:
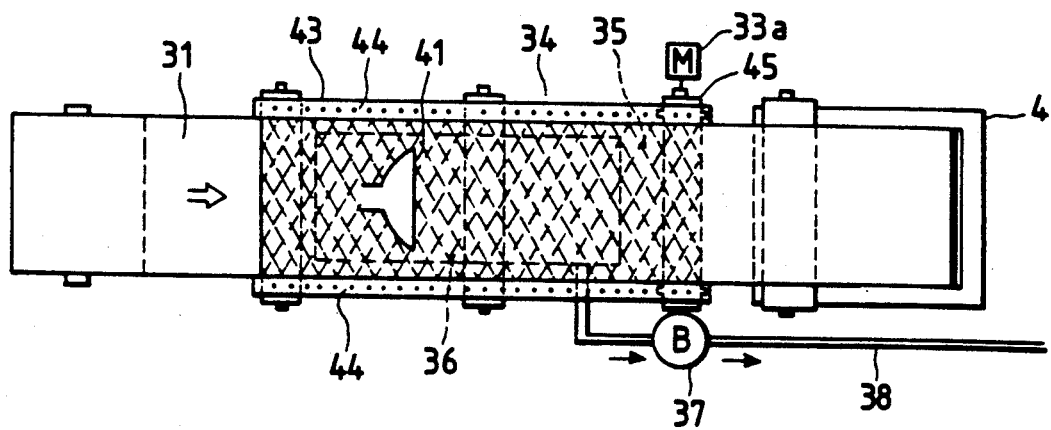

FIG. 2 (a) is a diagram showing a construction of a second embodiment of the invention; and FIG. 2 (b) is a plan view thereof. An endless meshed member (43), which is provided with belts (44) having sprocket holes on each of the opposing surfaces of the meshed surface (35), is interposed between the sheet-like filter medium (31) and the box (36). The meshed member (43) travels in a direction indicated by arrows by a sprocket (45) which is driven by a motor (33a). Reference numeral (42) designates a box for receiving a used portion of the filter medium (31).

In the second embodiment thus constructed, the meshed member (43) moves in the direction indicated by the arrows while driven by the sprocket (45) upon start of a machining process. At this moment, the filter medium (31) is sucked by the blower (37) and adheres to the meshed member (43) by the sucking force, thereby moving in the direction indicated by the arrows in association with movement of the meshed member (43). As a result, the used portion of the filter medium (31) falls down into the box (42) and is accommodated therein. The used portion of the filter medium (31) may instead be rewound by the rewind roll.

In the above embodiment, the upper surface of the box (36) may either be opened or covered with the meshed surface (35). In addition, to allow the meshed member (43) to travel smoothly, the meshed member may be disposed relative to the box (36) so that a distance can be provided therebetween or may interpose a roller therebetween.

Figure 3A:
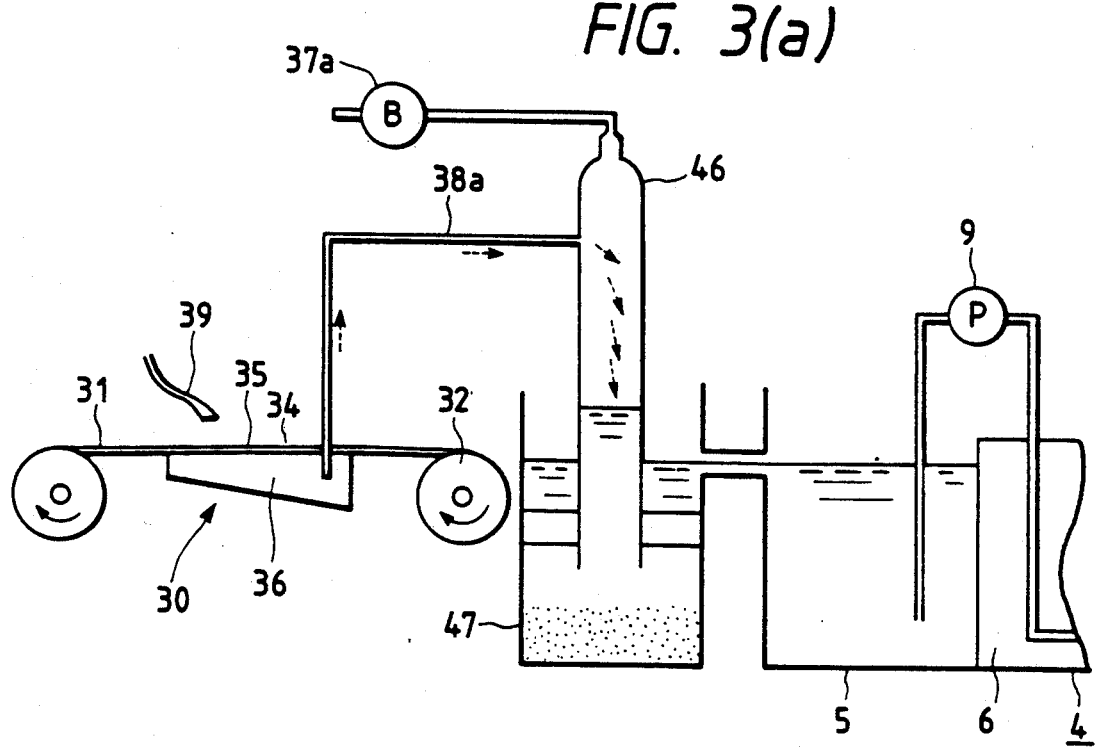
FIG. 3 (a) is a diagram showing a construction of a third embodiment of the invention.
Figure 3B:
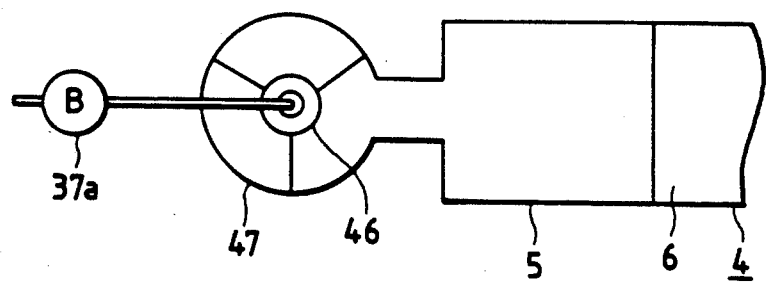

FIG. 3 (a) is a diagram showing a construction of a third embodiment of the invention; and FIG. 3 (b) is a plan view showing a main portion thereof. Although the blower (37) which can suck both gases and liquids is used in the first and second embodiments (shown in FIGS. 1 and 2), a blower (37a) which sucks only gases such as a Roots blower is used in the third embodiment. In this embodiment, a contaminated machining solution storage tank (47), which is in communication with a machining solution filtration unit (4), is disposed close to a contaminated solution vessel (5); a gas-liquid separating tower (46), a part of which is inserted into the contaminated machining solution storage tank (47) is arranged; the sucking inlet of the blower (37a) is connected to the top of the gas-liquid separating tower (46); and the box (36) and an upper portion of the gas-liquid separating tower (46) are connected by a pipe (38a) (However, the upper portion is lower than the portion connecting to the blower (37a)).

In the third embodiment thus constructed, the contaminated machining solution and air within the box (36) are introduced into the upper portion of the gas-liquid separating tower (46) by suction by the blower (37a), and the contaminated machining solution drops down into the contaminated machining solution storage tank (47) by its own weight, while the air is discharged from an outlet of the blower (37a). The contaminated machining solution stored in the contaminated machining solution storage tank (47) is introduced into the contaminated solution vessel (5) and recycled to be a clean machining solution by the machining solution filter (7).

FIG. 4 (a) is a diagram showing a construction of a fourth embodiment of the invention; and FIG. 4 (b) is a plan view showing a main portion thereof. In this embodiment, the solution discharge pipe (3a) of the machining vessel (3) has the outlet over the contaminated solution vessel (5) to allow a contaminated machining solution to be introduced into the contaminated solution vessel (5), while a suction pump (49) is connected to a pipe (48), one end of which is immersed into the contaminated solution vessel (5), and the other end of which is connected to the scattering device (41) which is mounted above the sucking section (34).

In this embodiment which is thus constructed, upon instruction for driving the machining solution filtration unit (4), the motor (33) is operated to rewind the filter medium (31) around the rewind roll (32), causing not only the filter medium (31) to move on the meshed surface (35), but also the suction pump (49) to be started. The contaminated machining solution containing machining scraps produced between the electrode and a workpiece as a result of machining is introduced into the contaminated solution vessel (5) from the discharge pipe (3a). In the meantime, the suction pump (49) sucks the contaminated machining solution in the contaminated solution vessel (5), sends it to the scattering device (41) through the pipe (48), and scatters and discharges it over the filter medium (31). The contaminated machining solution from which the large machining scraps have been removed by the filter medium (31) is returned to the contaminated solution vessel (5) through the pipe (38), and recycled to be a clean machining solution at the cleaning vessel (6) by following the operation which has previously been described in the conventional example shown in FIG. 16.

Although the case where the machining solution filtered by the filtration device (30) is returned to the contaminated solution vessel (5) and supplied to the filter (7) by the filter pump (9) has been described, the filtered machining solution may be returned to the clean solution vessel (6) as described in the first embodiment (FIG. 1), or the filtered machining solution may be further filtered by the filter (7) as shown by the broken lines in FIG. 4 (a).

Figure 5A:
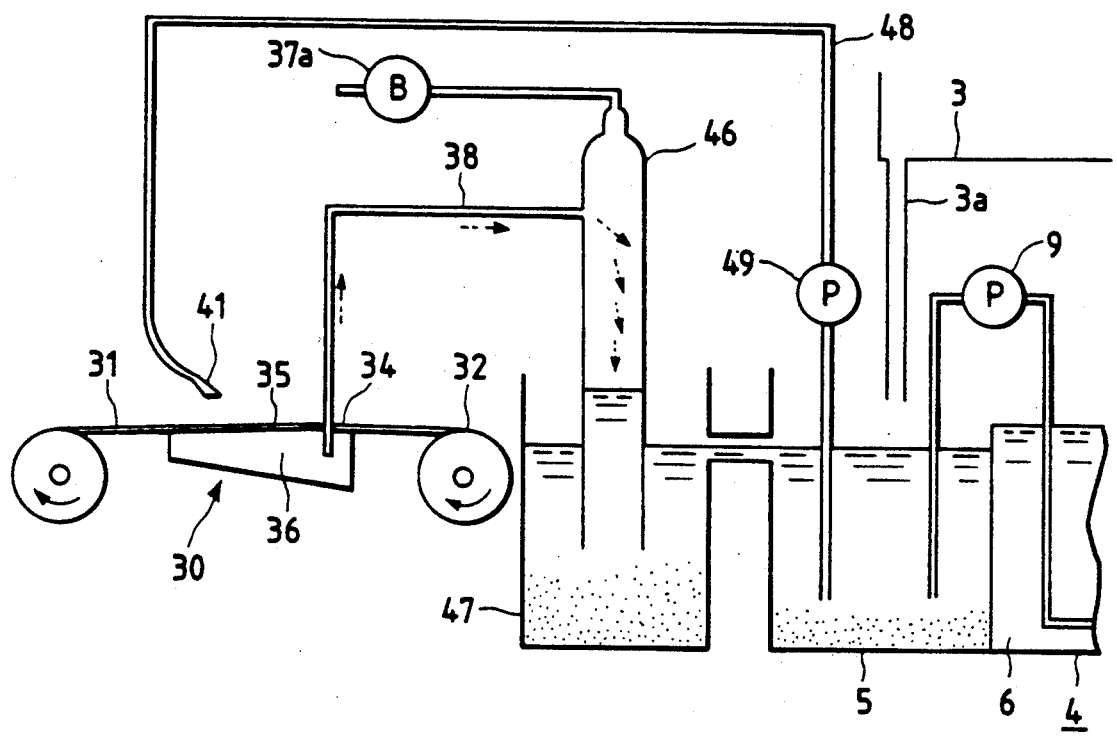
FIG. 5 (a) is a diagram showing a construction of a fifth embodiment of the invention.
FIG. 5(b) is a plan view showing a main portion thereof.
Figure 5B:
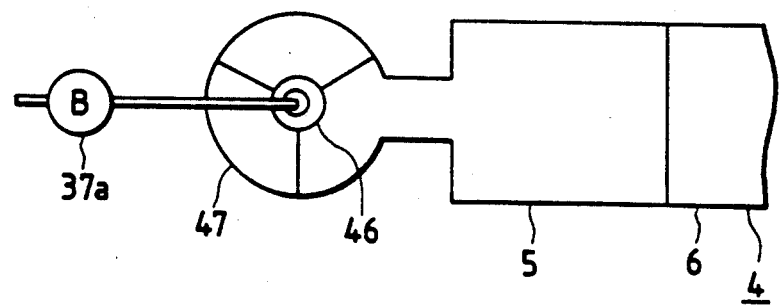

FIGS. 5(a) and 5(b) show a fifth embodiment of the invention. In this embodiment, a machining solution contaminated by a machining operation is introduced into the contaminated solution vessel (5), and the contaminated machining solution sucked by the suction pump (49) from the contaminated solution (5) is then supplied to the scattering device (41) through the pipe (48). Operations of the filtration device (30) and gas-liquid separating tower (46) are the same as those shown in the third embodiment FIGS. 3(a) and 3(b).

Figure 6A:
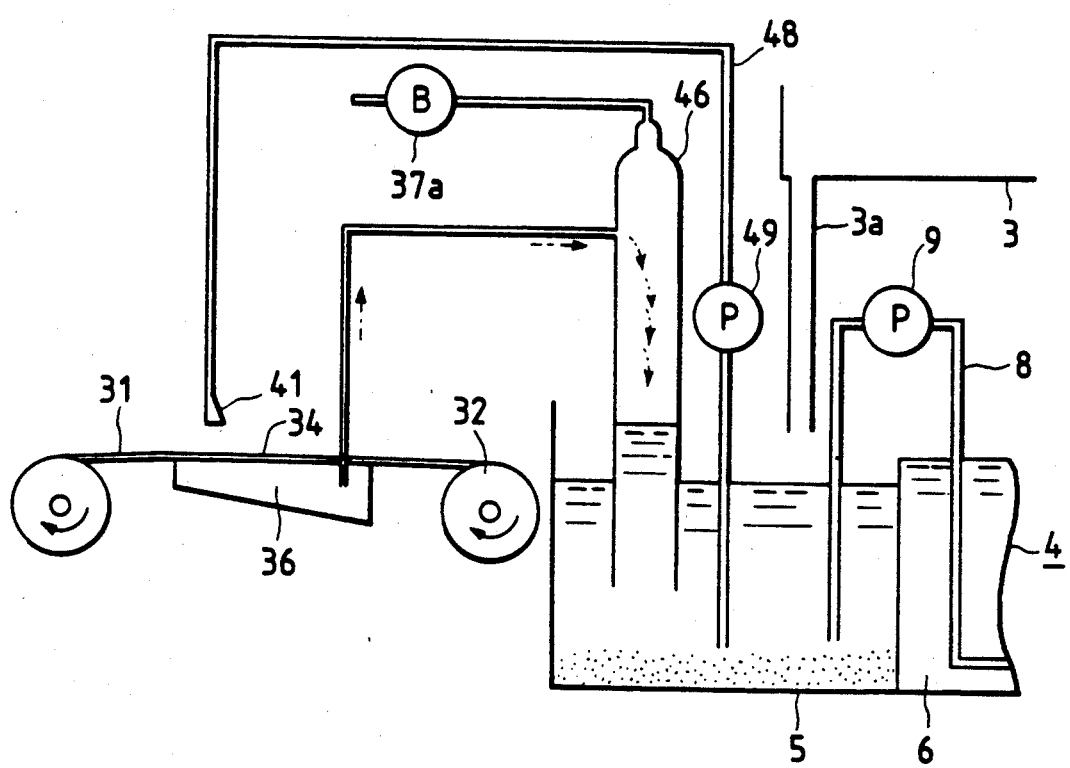
FIG. 6 (a) is a diagram showing a construction of a sixth embodiment of the invention.
Figure 6B:
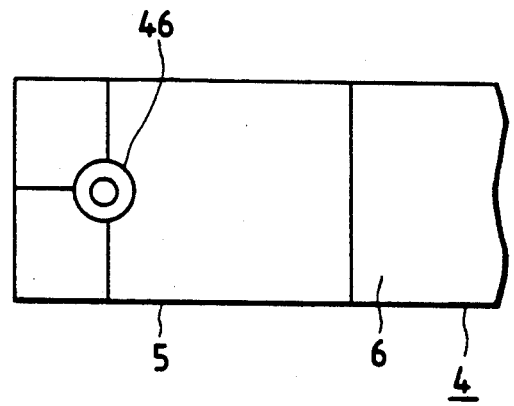

FIGS. 6(a) and 6(b) show a sixth embodiment of the invention. A contaminated machining solution from the machining vessel (3) is introduced into the contaminated solution vessel (5), while both the pipe (48) having the suction pump (49) and the gas-liquid separating tower (46) are immersed into the contaminated solution.

Figure 7A:
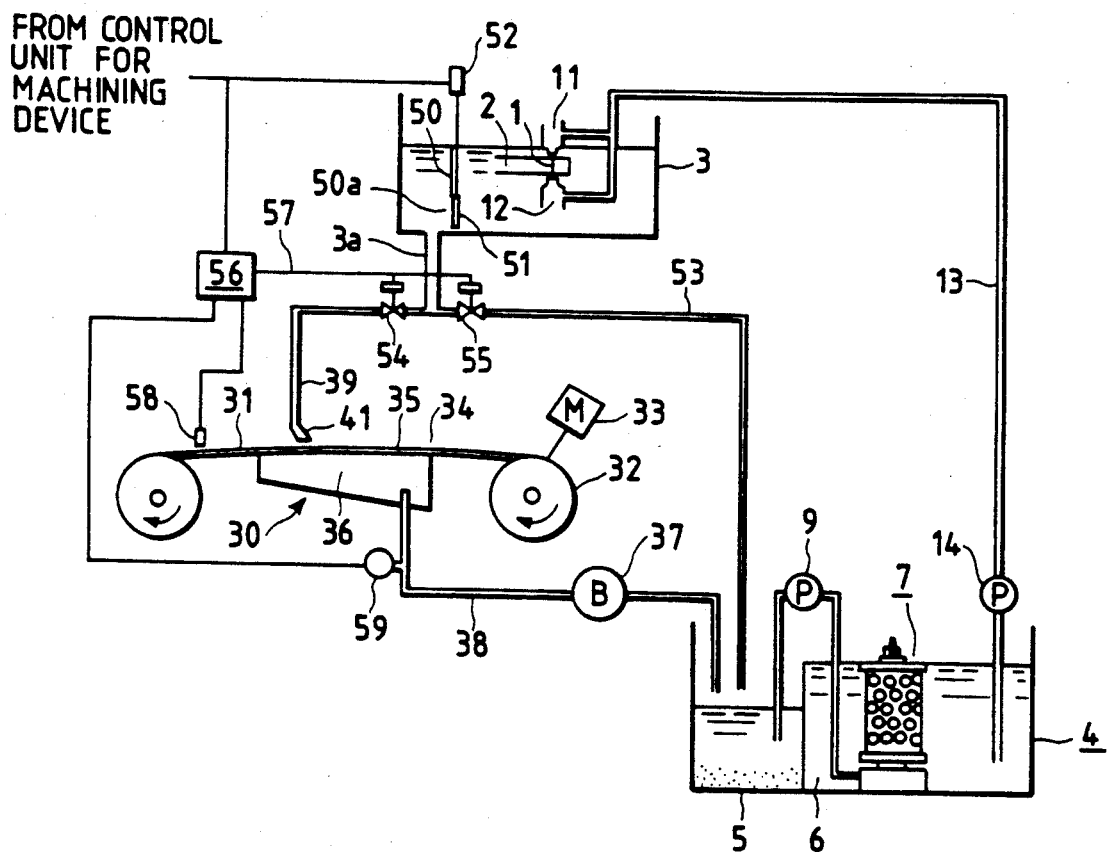
FIG. 7 (a) is a diagram showing a construction of a seventh embodiment of the invention.
Figure 7B:
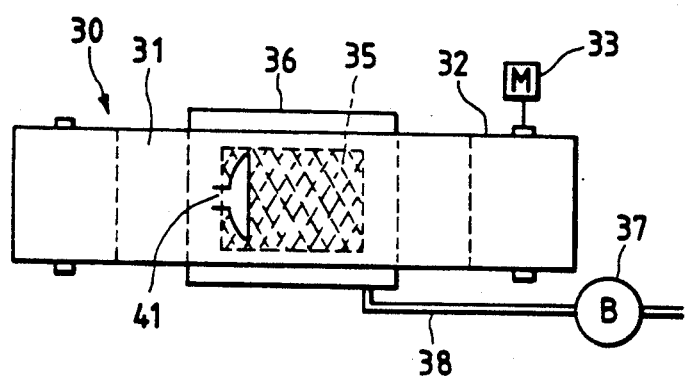

FIGS. 7(a) and 7(b) show a seventh embodiment of the invention. The machining solution filtration unit (4) and the filtration device (30) are the same as those in the fourth embodiment FIGS 4(a) and 4(b). Reference numeral (50) designates a partition board disposed inside the machining vessel (3). At a lower position of the partition board is an opening (50a) arranged so that a machining solution is movable therethrough. Reference numeral (51) designates a gate which is driven by a cylinder (52) operated by a signal from a controller (not shown) of the electric discharge machining device (hereinafter referred to as "host controller") to open and close the opening (50a) of the partition board (50). Reference numeral (53) is a pipe connected to the discharge pipe (3a) of the machining vessel (3). One end of this pipe (53) has an outlet over the contaminated solution vessel (5) and the other end thereof is connected to the scattering device (41) arranged above the filter medium (31) of the sucking section (34). On both sides of the pipe (53) connected to the discharge pipe (3a) are electromagnetic valves (54), (55) provided.

Reference numeral (56) designates a controller for switching flow paths connected to the host controller. This controller (56) receives signals from an optical sensor (58) of a transmission type or reflection type, and from a negative pressure gauge (59) for measuring negative pressures generated by the sucking device, i.e., the blower (37). Its outputs are applied to the electromagnetic valves (54), (55).

An operation of the seventh embodiment thus constructed will be described next. When a machining solution is supplied between the electrode and a workpiece upon start of a machining process, the motor (33) is operated, causing the filter medium (31) to be rewound around the rewind roll (32) and move along the meshed surface (35) of the sucking section (34) at a predetermined speed, while causing the blower (37) to start its operation. During normal machining, the electromagnetic valve (54) is open and the electromagnetic valve (55) is closed, and the contaminated machining solution containing machining scraps produced in the interelectrode gap by the machining is supplied to the scattering device (41) from the discharge pipe (3a) via the electromagnetic valve (54). Since the inside of the box (36) disposed below the meshed surface (35) is negatively pressurized by the blower (37), the contaminated machining solution is sucked into the box (36) while passing through the filter medium (31) together with air. At this time, the machining scraps among those contained in the contaminated machining solution which are larger in size than the mesh of the filter medium (31) do not pass therethrough, thereby being entrapped by the filter medium (31). The filter medium (31) is not clogged because it is moving, so that stable filtering is ensured under the same condition at all times. The operation of filtering the contaminated machining solution stored in the contaminated solution vessel (5) is the same as described before.

By the way, in the case, e.g., of the wire cut electric discharge machining device (the example shown in FIGS. 7(a) and 7(b)) whose type is such that a workpiece (2) is machined while immersed in a machining solution, the gate (51) is closed during normal machining, and the contaminated machining solution which has overflowed the partition board (50) is discharged from the discharge pipe (3a). However, the machining solution stored in the machining vessel (3) must, in some cases, be discharged entirely for reasons of, e.g., a preparatory process. In such a case, the gate (51) is opened either by an instruction from the host controller or manually. As a result, the machining solution is discharged in a volume several times or several tens of times that during the normal machining, which is a volume that cannot be accommodated by the filtration device (30). Thus, in such a case, the electromagnetic valve (54) is closed and the electromagnetic valve (55) is opened based on an instruction from the controller (56) thereby to directly discharge the contaminated machining solution to the contaminated solution vessel (5) via the discharge pipe (3a) and the pipe (53).

In the event of an abnormality such as a reduction in the sucking force of the blower (37) for some reason or an absence of the filter medium (31), the reduction in the sucking force can be detected by the negative pressure gauge (59) while the absence of the filter medium (31) can be detected by the optical sensor (58). Therefore, the detected abnormality signals are sent to the controller (56) to switch the electromagnetic valves (54), (55) so as to discharge the contaminated machining solution directly to the contaminated solution vessel (5).

While the electromagnetic valves (54), (55) are used as means for switching the paths of the contaminated machining solution in the above description, other switching means operated either automatically or manually may be used as well. While the negative pressure gauge (59) disposed on the pipe (38) is used to check the sucking force of the blower (37), other means may be used; e.g., a float switch may be arranged within the box (36), which float switch ascends with increasing level of the contaminated solution due to reduction in the sucking force and sends a sucking force reduction signal to the controller (56) in such a case.

While the absence of the filter medium (31 is detected by the optical sensor (58), other means, in which, e.g., an encoder is mounted on the shaft of a supply roll of the filter medium (31) and the encoder detects the rotation of the supply roll, may also be employed. In addition, other than these, the machining solution path switching may be performed by detecting an overflow of the contaminated machining solution and a stop of movement of the filter medium (31) in the filtration device (30) as signals and applying the detected signals to the controller (56).

Figure 4A:
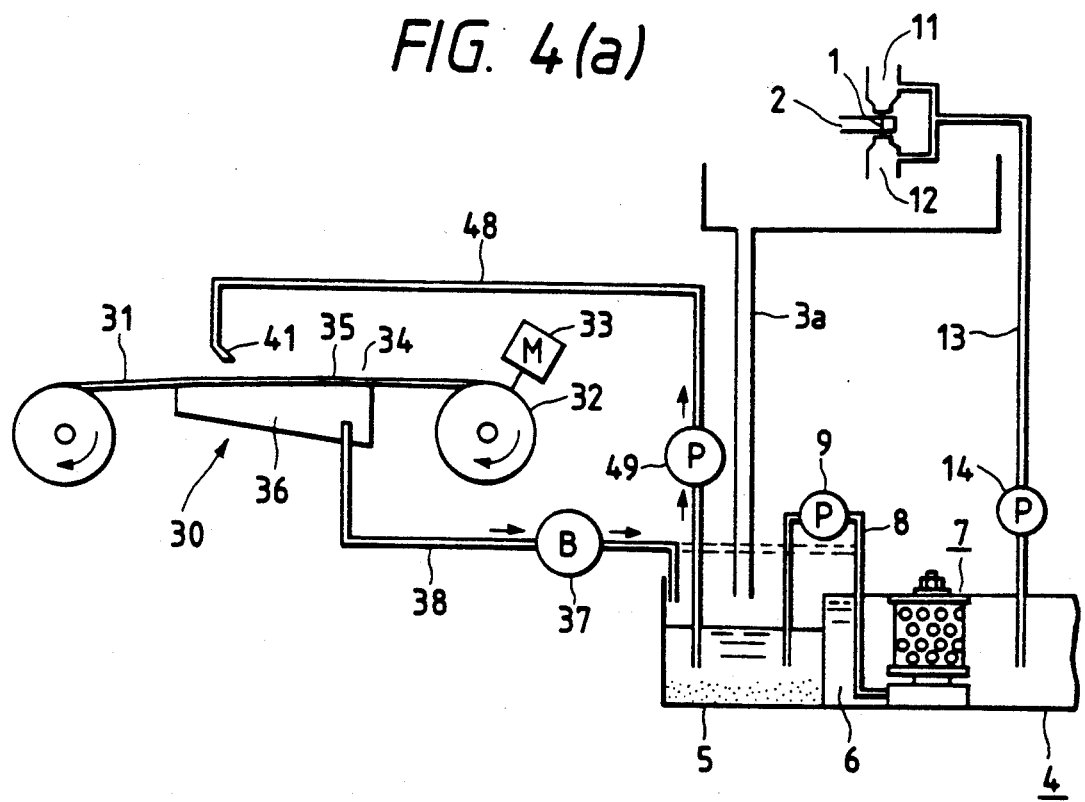
FIG. 4 (a) is a diagram showing a construction of a fourth embodiment of the invention.
Figure 4B:
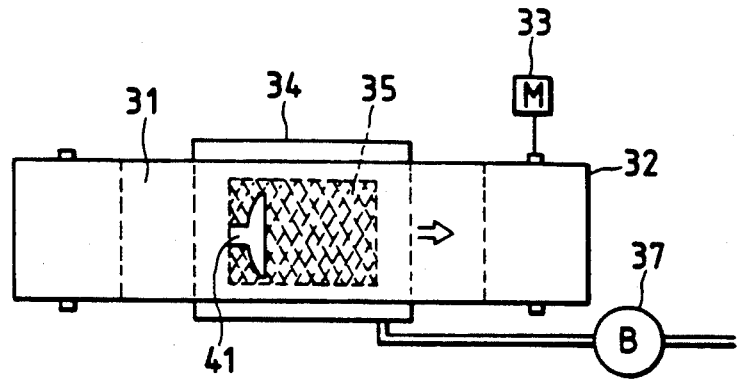
Figure 8A:
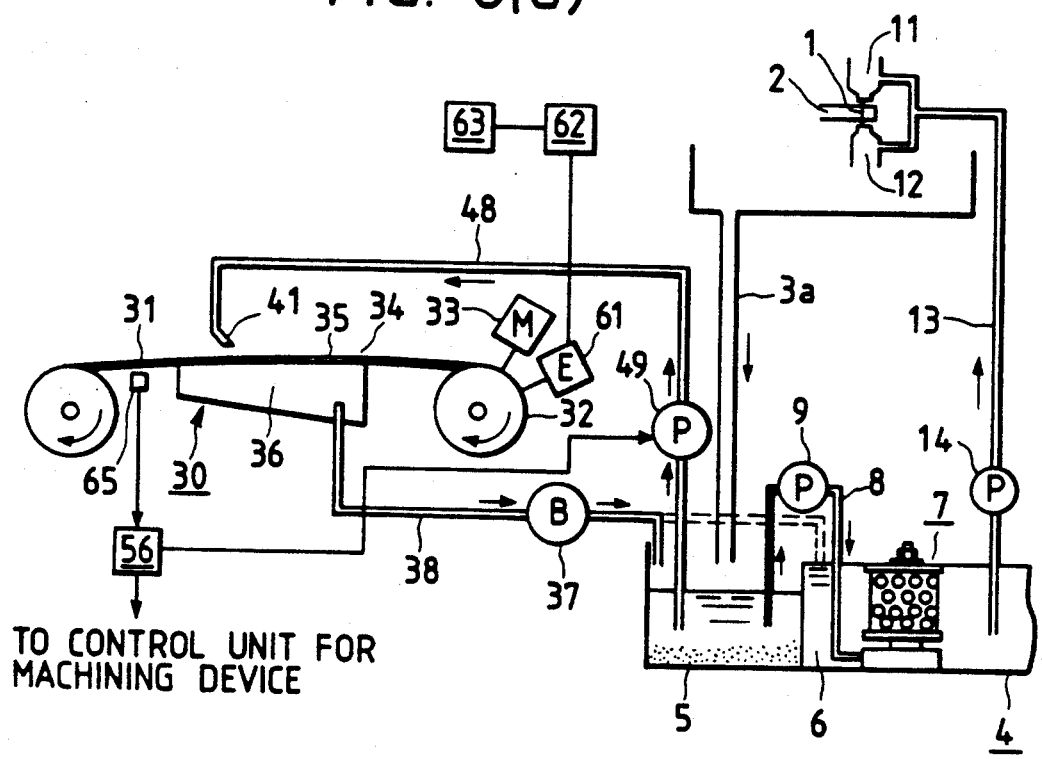
FIG. 8 (a) is a diagram showing a construction of a eighth embodiment of the invention.
Figure 8B:
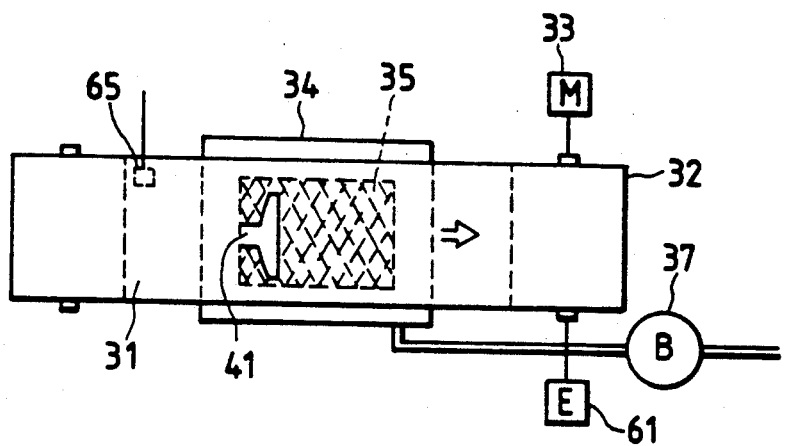

FIGS. 8(a) and 8(b) show an eighth embodiment of the invention, in which the machining solution filtration unit (4) and the filtration device (30) are the same those in the fourth embodiment (FIGS 4(a) and 4(b)). An encoder (61) mounted on the rewind roll (32) has its output signals applied to a counter (62), and the counts of the counter (62) are displayed on a display device (63). The controller (56) not only receives output signals from an optical sensor (65) which is disposed so as to confront the filter medium (31) and which detects the presence/absence of the filter medium (31), but also applies the corresponding signals to the suction pump (49). Output signals of the controller (56) are also applied to the host controller (not shown).

By the way, in the above embodiments, the filtration device (30) continues its operation in the absence of the filter medium (31), causing the contaminated machining solution to be supplied to the clean solution vessel or cleaning vessel (6) with no filtration being performed. In the case of the wire cut electric discharge machining device, such continuous machining with the unfiltered machining solution provokes breakage of the wire electrode due to secondary discharge or concentrated discharge caused by machining debris in the machining solution. This causes inconvenience that impedes stable machining.

In addition, the absence of means for checking the life of the filter medium (31) in terms of length or time prevents an operator from being informed of the timing of replacing the filter medium (31), requiring him or her to frequently check the presence/absence of the filter medium (31) during machining.

In this embodiment, rotation of the rewind roll (32) is detected by the encoder (61), so that the life of the filter medium (31) can be counted by the counter (62) and displayed by the display device (63). The presence/absence of the filter medium (31) is checked by the optical sensor (65), which, upon detection of its absence, applies an output to the controller (56). The controller stops not only the suction pump (49) immediately but also the motor (33) and the blower (37) via signals from the host controller. In this case, even if the filtration device (30) has been stopped, the current machining operation may be continued because the contaminated machining solution is being filtered by the machining solution filter (7) as long as the operation of the filtration device (30) can be resumed by setting a new filter medium (31) thereto.

Figure 9A:
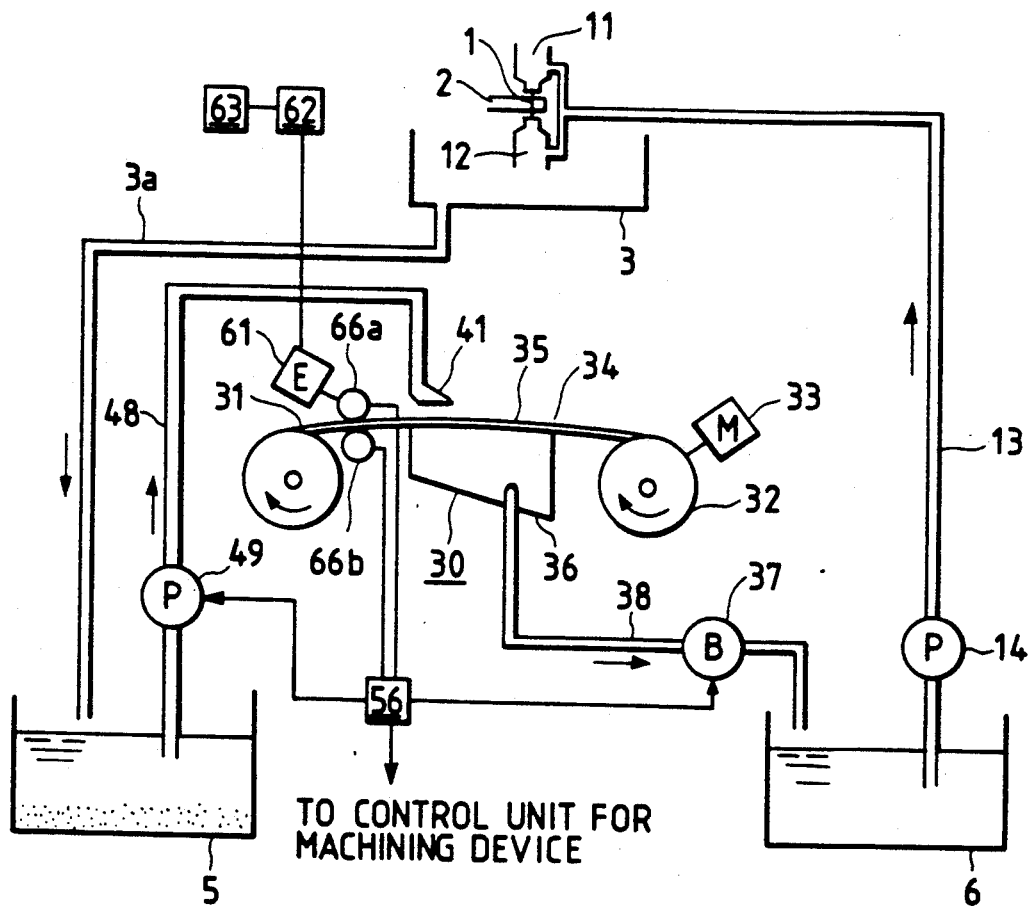
FIG. 9 (a) is a diagram showing a construction of a ninth embodiment of the invention.
Figure 9B:
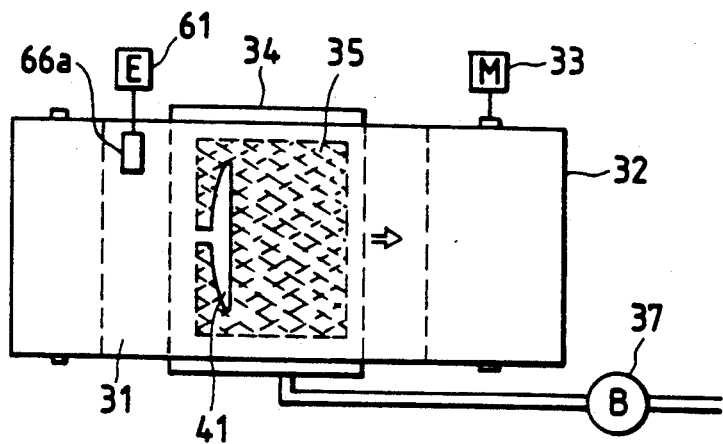

FIGS 9(a) and 9(b) show a ninth embodiment of the invention. In this embodiment, although the contaminated solution vessel (5) is arranged distant from the clean solution vessel (6), and no machining solution filter (7) is provided, the filtration device (30) is the same as in the fourth embodiment (FIGS. 4(a) and 4(b)). Rollers (66a), (66b), each of which is made of an electroconductive material, are disposed so as to confront each other while interposing the filter medium (31) therebetween. Both rollers (66a), (66b) are respectively connected to the controller (56). Outputs of the controller (56) are applied to the blower (37), the suction pump (49), and the host controller (not shown). Reference numeral (61) designates an encoder mounted on one (66a) of the rollers; (62), a counter; and (63), a display device.

In this embodiment, the rollers (66a), (66b) are being insulated when the filter medium (31) is present therebetween, while they contact and are brought into conduction when the filter medium (31) is absent therebetween. Therefore, the presence/absence of the filter medium (31) (nonconduction/conduction) is judged by the controller (56), and if the filter medium (31) is absent, the controller causes the blower (37) and the suction pump (49) to be stopped, while it applies a signal to the host controller to stop the machining operation.

The encoder (61) can count the length for forwarding the filter medium (31). Further, a length of the filter medium (31) required to complete the machining operation can be displayed by receiving information about the remaining machining time from the host controller and estimating the length from such remaining machining time. Furthermore, the timing for replacing the filter medium (31) can be informed of by comparing the thus estimated required length of the filter medium (31) with the remaining filter medium (31) detected by the encoder (61) and issuing an alarm when it is judged that the filter medium (31) will soon run out.

Figure 10A:
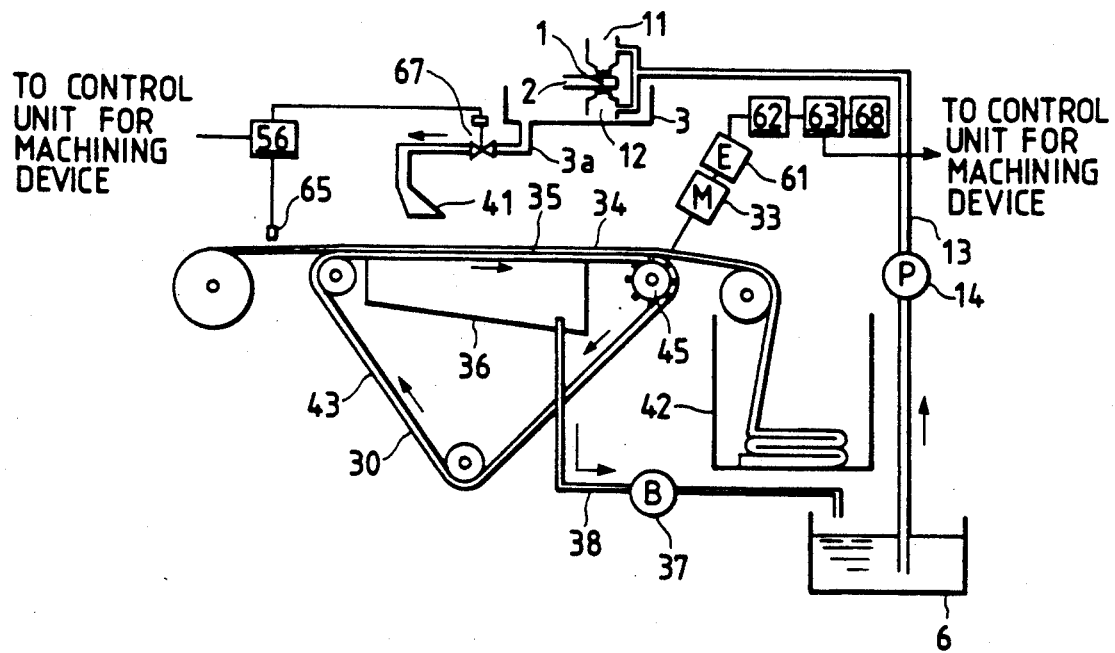
FIG. 10 (a) is a diagram showing a construction of a tenth embodiment of the invention.
Figure 10B:
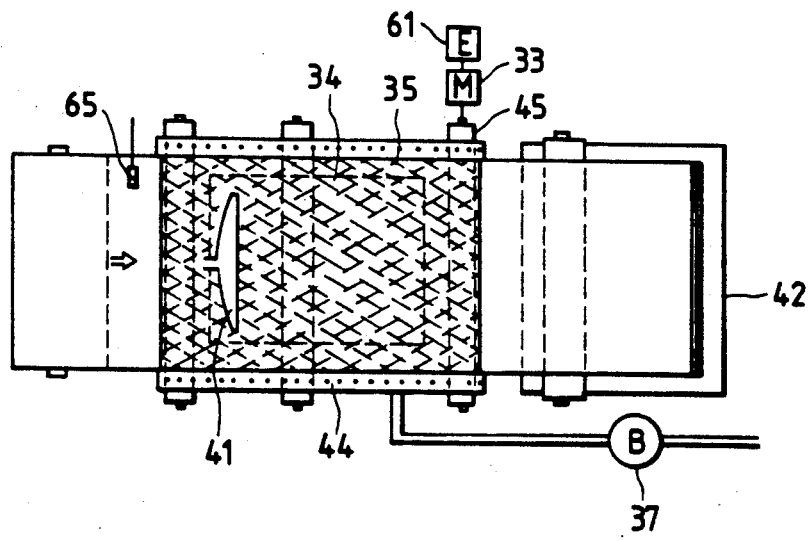

FIGS. 10(a) and 10(b) show a tenth embodiment of the invention. The structure of the filter device (30) is the same as in the second embodiment (FIGS 2(a) and 2(b)). Reference numeral (65) designates an optical sensor disposed in proximity to the filter medium (31); (67), an electromagnetic valve disposed on the way to the discharge pipe (3a); and (64), a controller. Outputs from the optical sensor (65) are applied to the controller (64), whose outputs are applied to the electromagnetic valve (67) and the host controller (not shown). Reference numeral (61) designates an encoder mounted on the motor (33a) which drives the sprocket (45); (62), a counter; (63), a display device; and (68), an alarm.

When the optical sensor (65) detects the absence of the filter medium (31), the detected signal is applied to the controller (56) so that the controller (56) can not only close the electromagnetic valve (67) but also applies a signal to the host controller to stop the machining operation of the machining device and replace the filter medium (31) with a new one.

In the meantime, the length of the filter medium to be supplied is calculated by the encoder (61) and the counter (62), and when the measured length of the filter medium (31) becomes smaller than a predetermined value, either a buzzer or alarm lamp is turned on by the alarm (68). Use of a rotating lamp as the alarm lamp may help attract attention from the operator more positively.

While the presence/absence or remaining length of the filter medium (31) are detected by the encoder 61), the optical sensor (65), or the electroconductive rollers (66a), (66b) in the above description, other means may, of course, be used.

Figure 11A:
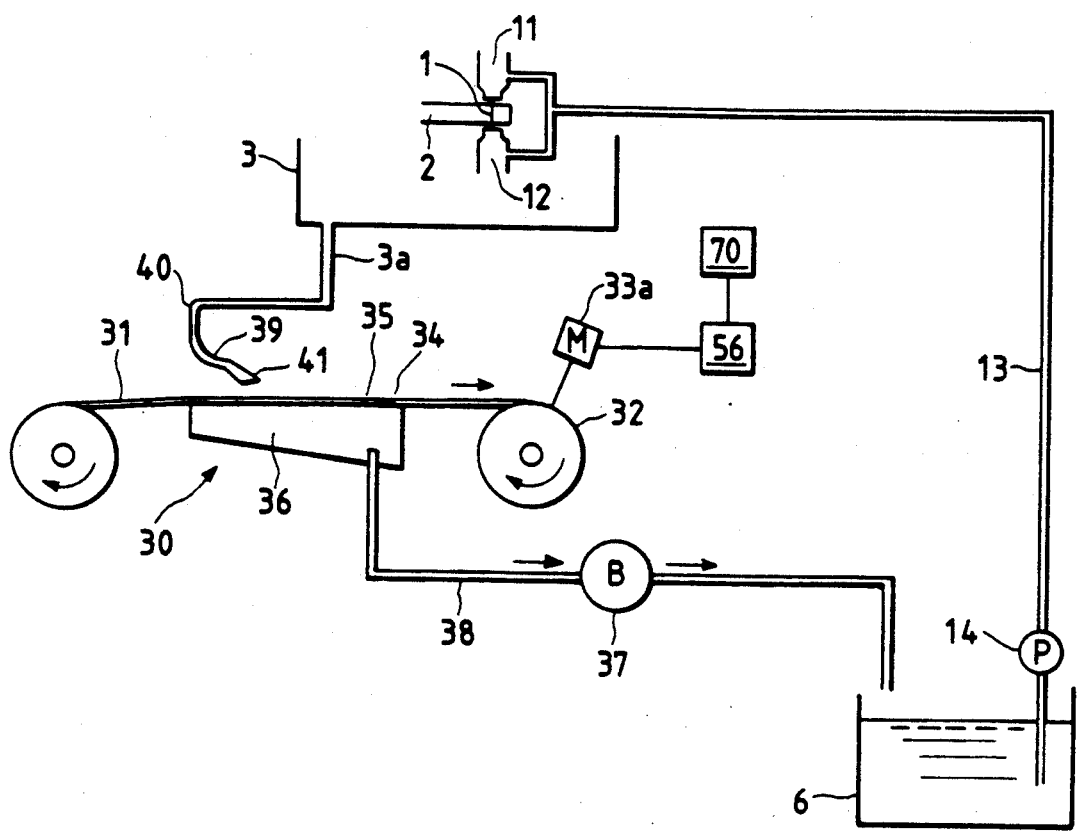
FIG. 11 (a) is a diagram showing a construction of a eleventh embodiment of the invention.
Figure 11B:
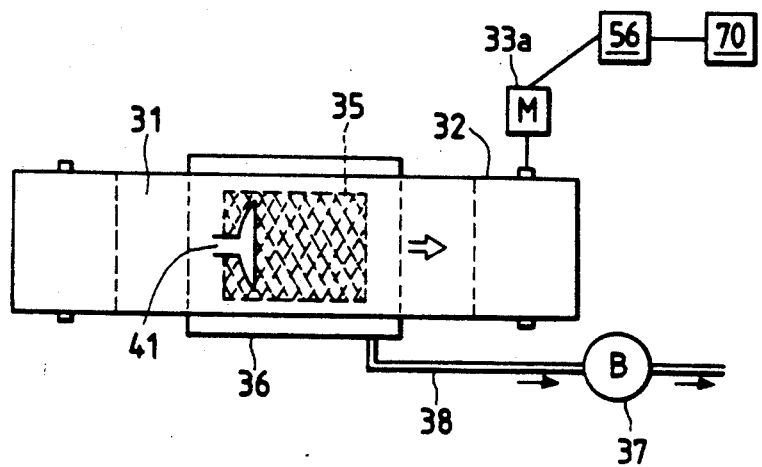

FIGS. 11(a) and 11(b) show an eleventh embodiment of the invention. Its construction is substantially the same as in the first embodiment. In the eleventh embodiment, a variable-speed motor is used as the motor (33a) for driving the rewind roll (32). This variable-speed motor (33a) is controlled by the controller (56). A speed reference to the variable-speed motor (33a) is applied either by a programmed-instruction from the machining device controller, or host controller, (70) or manually.

During electric discharge machining, the volume of the machining scraps produced in the interelectrode gap per unit time of machining is proportional to supplied machining energy. The machining energy is determined by setting parameters of a machining power source (not shown) such as an applying voltage, a current pulse duration, a current wave height, and a downtime. These parameters are instructed from the machining device controller (70) to the machining power source. These parameters depend on the material and thickness of a workpiece (2), the diameter of the wire electrode (1), and the desired machining speed. These data are stored in the machining device controller (70) while numbered as an electric condition pattern. Therefore, if a number corresponding to a desired electric condition pattern in the machining program is requested, the desired electric condition pattern is automatically set and the machining is started. The speed of the variable-speed motor (33a) is set as one of the electric condition pattern parameters and a speed reference is sent to the controller (56) of the variable-speed motor (33a) at the time an electric condition parameter is applied to the machining power source. The speed of the variable-speed motor (33a) can be determined either from the amount of produced machining scraps and the entrapping capacity of the filter medium (31) or empirically. The speed reference may, of course, be sent directly to the controller (56) manually.

In this embodiment, the filter medium (31) is rewound and thus moves at a speed determined by the above parameters, thereby being free from clogging. This permits stable filtration under the same condition at all times.

Figure 12A:
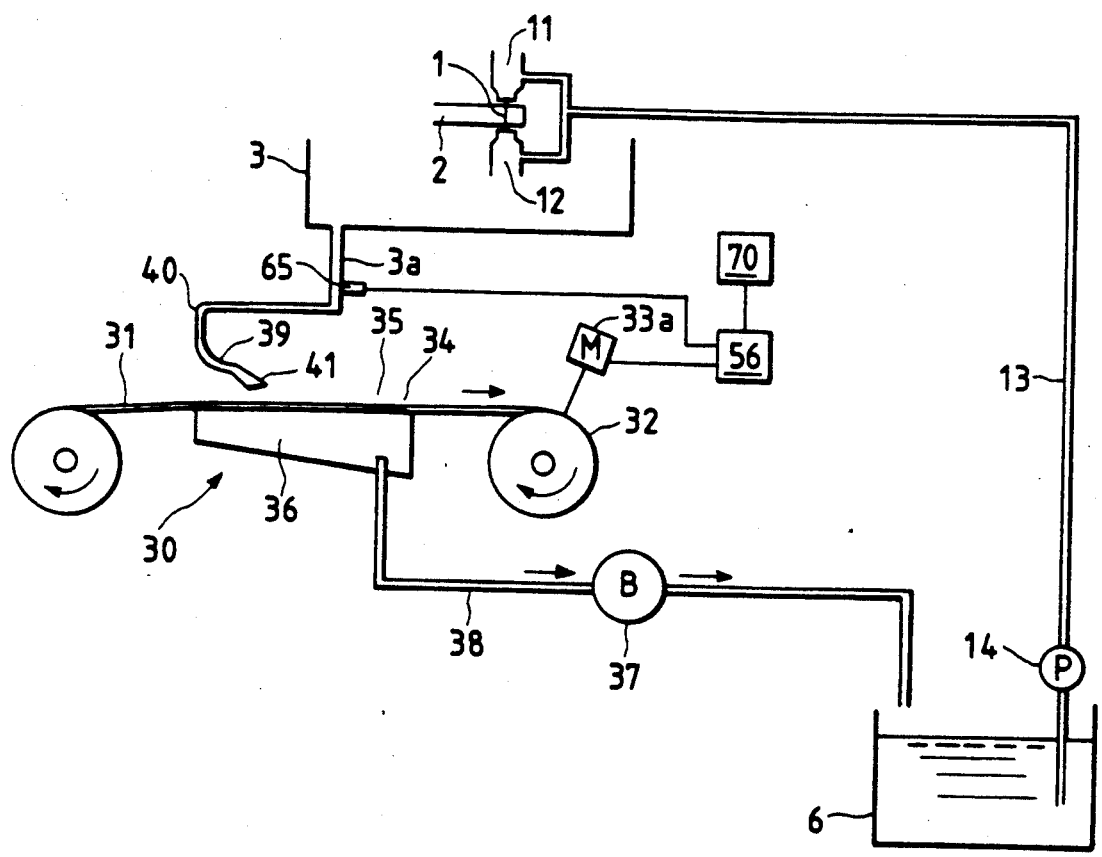
FIG. 12 (a) is a diagram showing a construction of a twelfth embodiment of the invention.
Figure 12B:
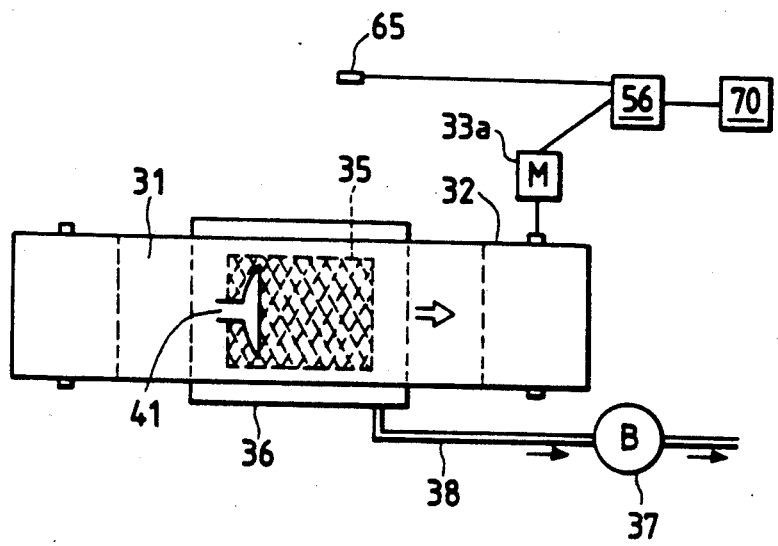

FIGS. 12(a) and 12(b) show a twelfth embodiment of the invention. In this embodiment, the optical sensor (65) is provided in proximity to the discharge pipe (3a), and optical sensor outputs are applied to the controller (56). The optical sensor (65) detects the degree of contamination of a machining solution which flows through the discharge pipe (3a) and applies the detected value to the controller (56). When the detected value is high, the amount of the machining scraps in the contaminated machining solution is large, thereby causing the controller (56) to increase the speed of the variable-speed motor (33a), while when the detected value is low, the amount of the machining scraps is small, thereby causing the controller to decrease the speed of the variable-speed motor to save the filter medium (31).

Figure 13A:
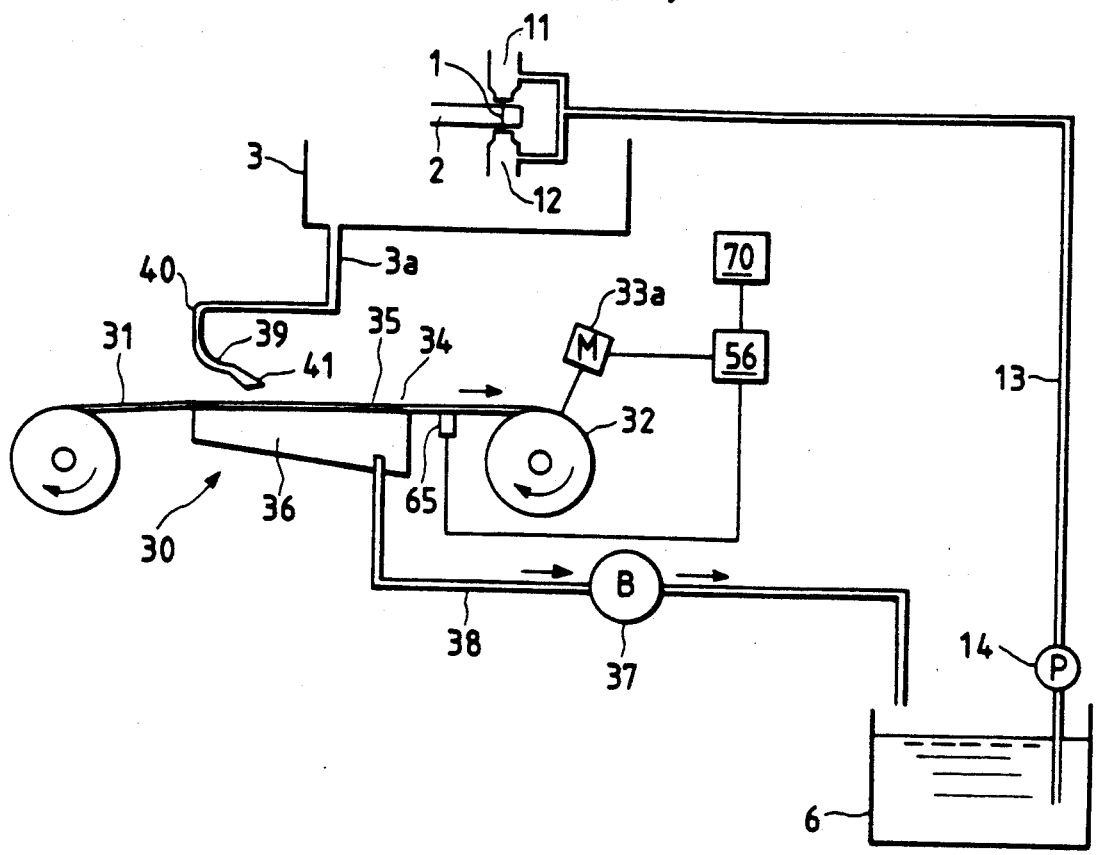
FIG. 13 (a) is a diagram showing a construction of a thirteenth embodiment of the invention.
Figure 13B:
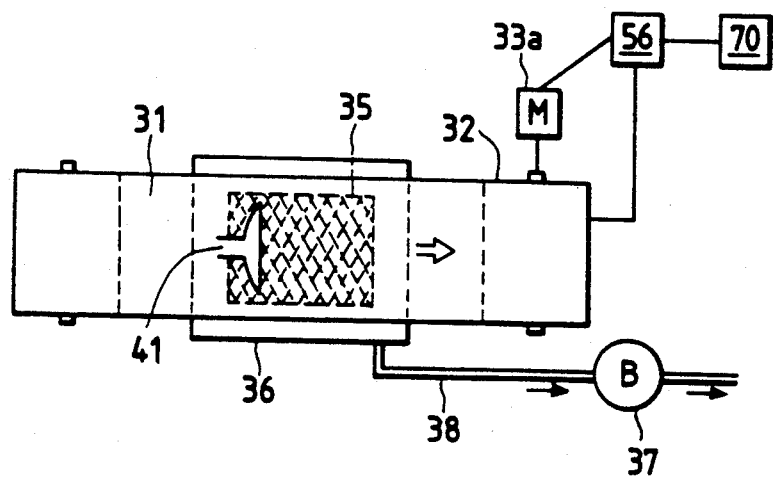

FIGS. 13(a) and 13(b) show a thirteenth embodiment. In this embodiment, the optical sensor (65) is disposed downstream of the box (36) to detect the degree of clogging of a used portion of the filter medium (31) and apply the detection signal to the controller device (56).

In this embodiment, a value which is an appropriate reference for clogging of the filter medium (31) is preset to the controller (56) to control the variable-speed motor (33a) so that the output of the optical sensor (65) approaches the reference value in attempts to supply the filter medium (31) efficiently.

Figure 14A:
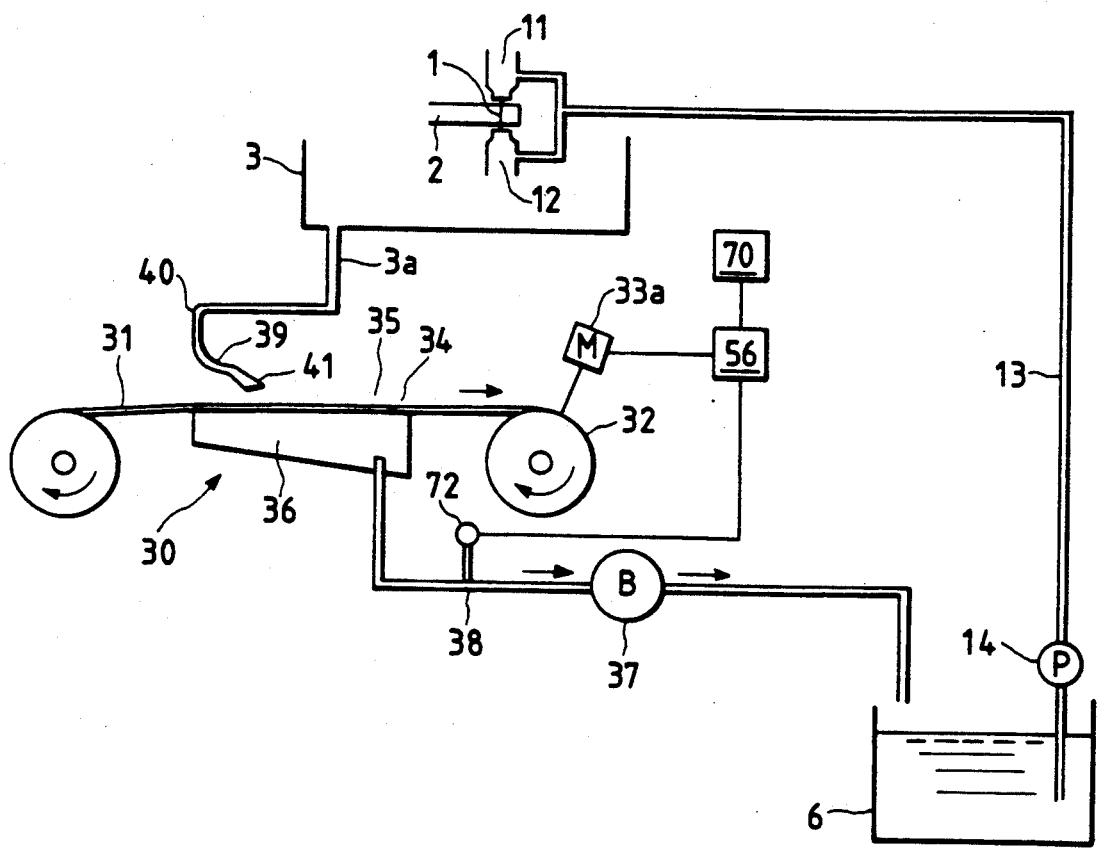
FIG. 14 (a) is a diagram showing a construction of a fourteenth embodiment of the invention.
Figure 14B:
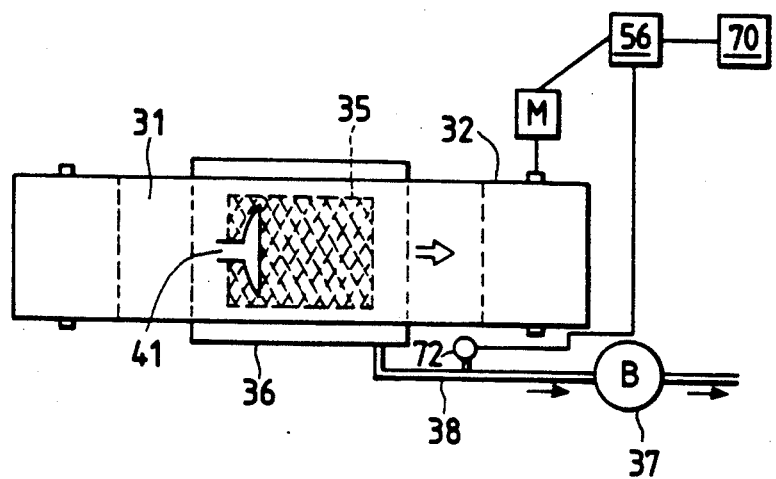

FIGS. 14(a) and 14(b) show a fourteenth embodiment of the invention, in which the negative pressure gauge (72) for measuring the negative pressure within the box (36) is disposed on the pipe (38) and its outputs are applied to the controller (56).

In this embodiment, if the speed of the variable-speed motor (33a) is excessively lower than prescribed incommensurate with the amount of the machining debris in the contaminated machining solution, the filter medium (31) is clogged and, as a result, the negative pressure within the box (36) is increased. If the filter medium (31) is not clogged because of the small amount of the machining debris, the amount of air to be sucked is increased so that the negative pressure is reduced. Thus, if a reference value which is an optimal negative pressure (a degree of appropriate clogging) is preset to the controller (56) and the speed of the variable-speed motor (33a) is controlled so that the output of the negative pressure gauge (72) approaches the reference value, then the filter medium (31) can be supplied efficiently.

In the embodiments shown in FIGS. 3(a) and 3(b), 4(a) and 4(b), 5(a) and 5(b), 6(a) and 6(b), and 7(a) and (7b) the motor (33) may be a variable-speed motor as in the eleventh embodiment (FIGS. 11(a) and 11(b)) to cause the controller (56) to control the speed of the filter medium (31). In these embodiment, the speed of the filter medium (31) may also be controlled by detecting the degree of contamination of the contaminated machining solution flowing through the discharge pipe (3a) as in the twelfth embodiment (FIGS. 12(a) and 12(b)), or by detecting the degree of clogging of a used portion of the filter medium (31) as in the thirteenth embodiment (FIGS. 13(a) and 13(b)), or further, by detecting the negative pressure within the box (36) as in the fourteenth embodiment (FIGS. 14(a) and 14(b)).

Figure 15A:
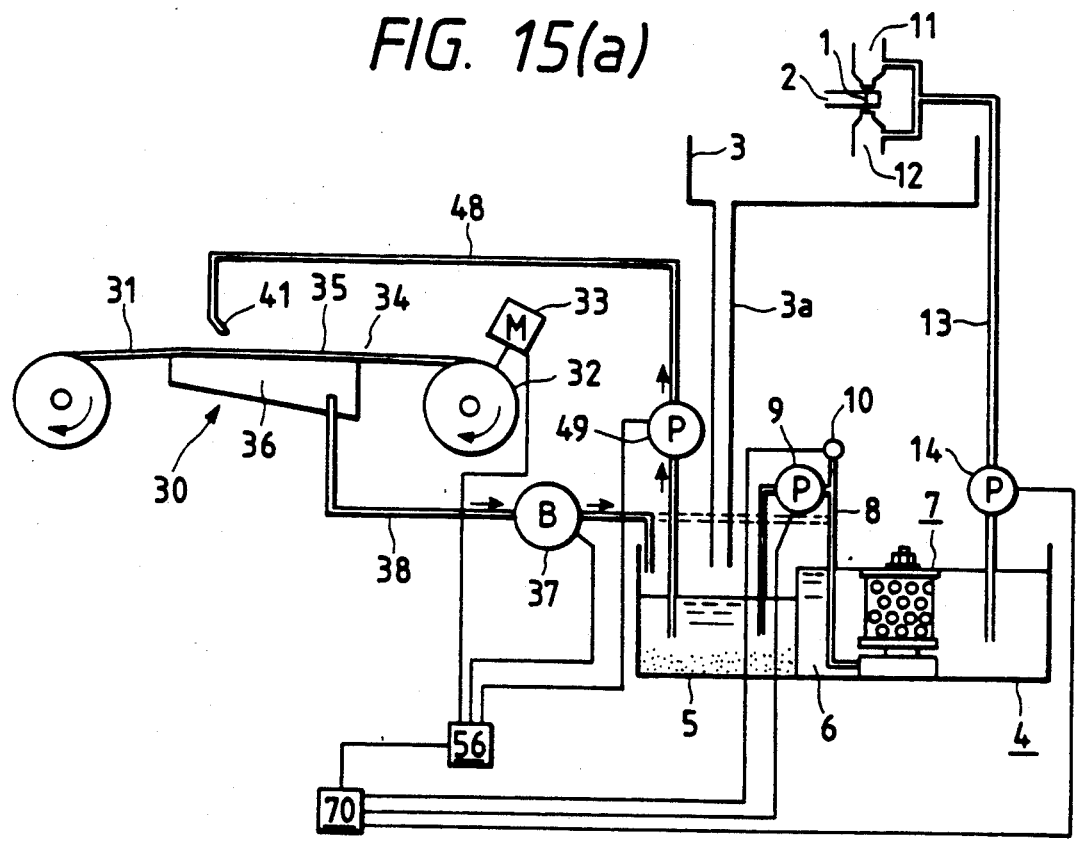
FIG. 15 (a) is a diagram showing a construction of a fifteenth embodiment of the invention.
Figure 15B:
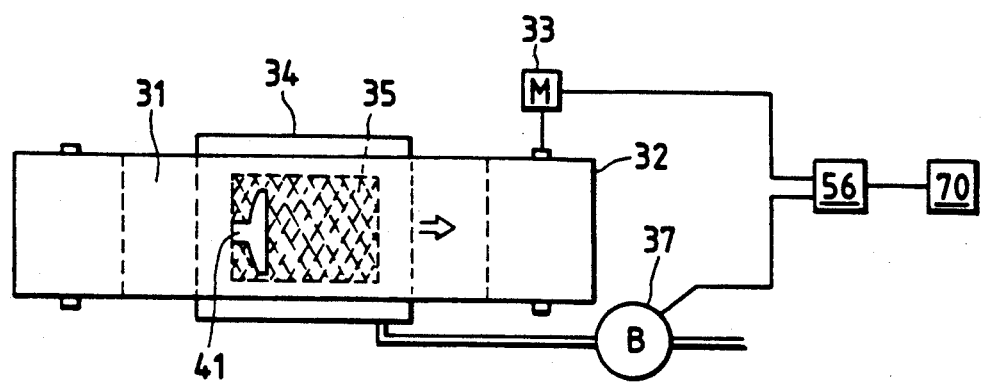
Figure 16:
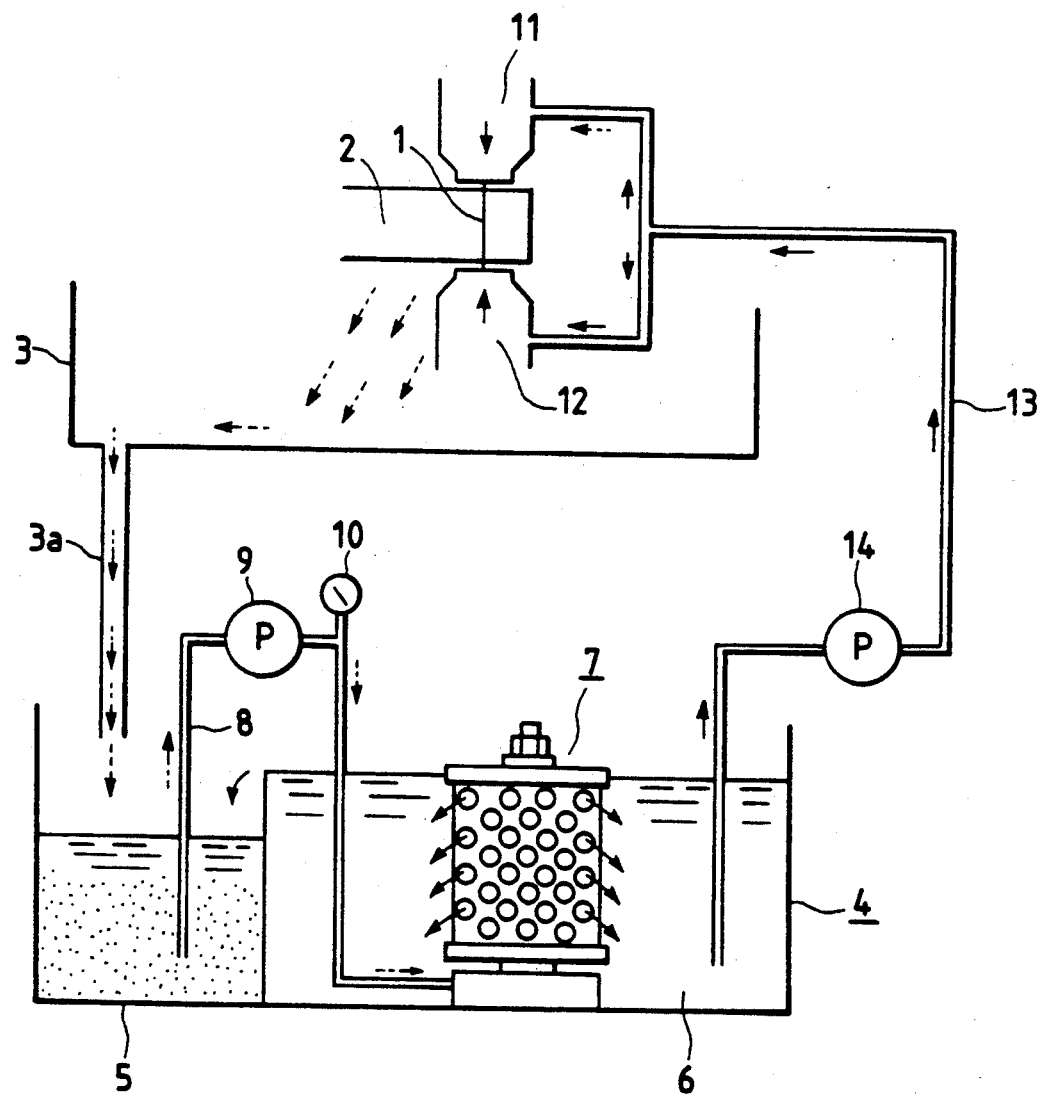
FIG. 16 is a schematic diagram showing a construction of an exemplary conventional machining solution filtration apparatus for an electric discharge machining device.
Figure 17A:
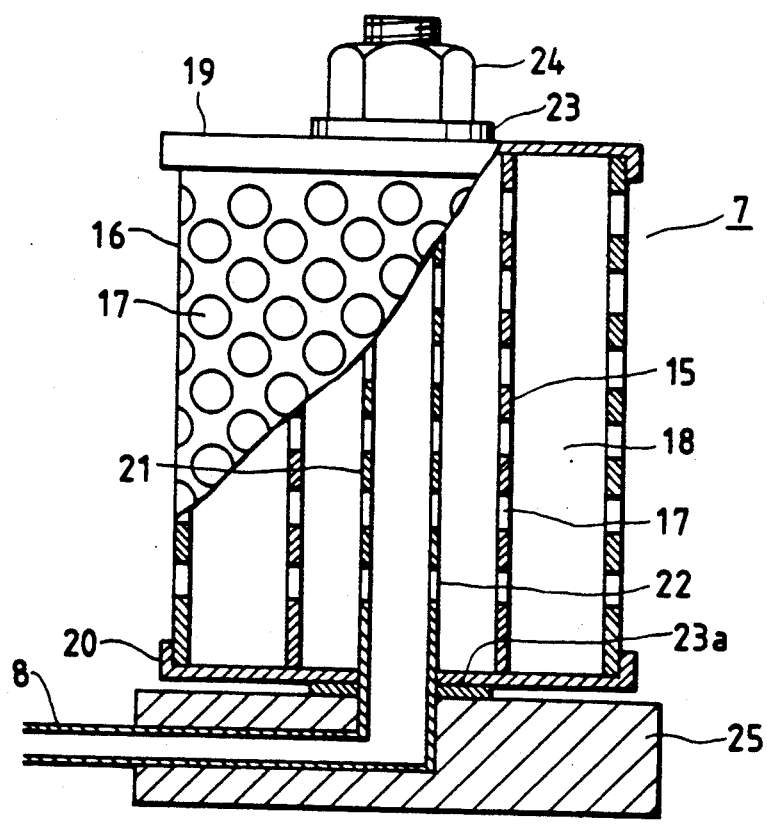
FIG. 17 (a) is a partially sectional view showing a conventional machining solution filter.
Figure 17B:
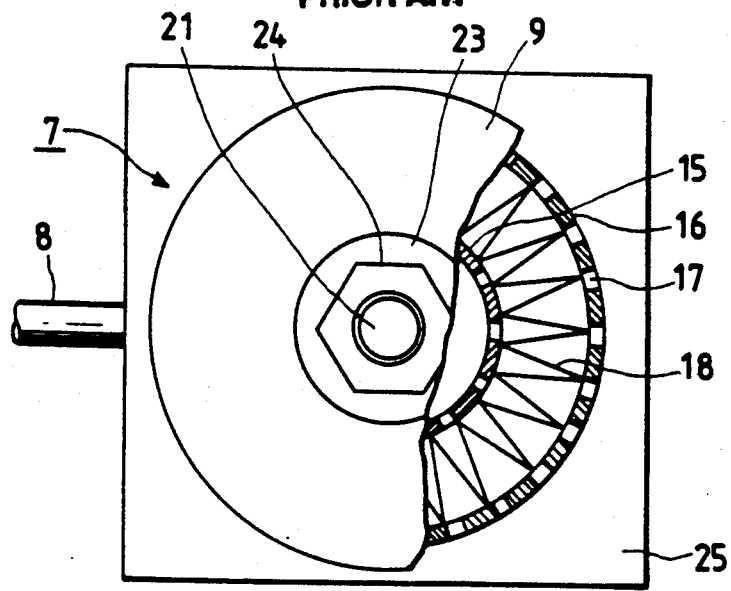
Figure 18:
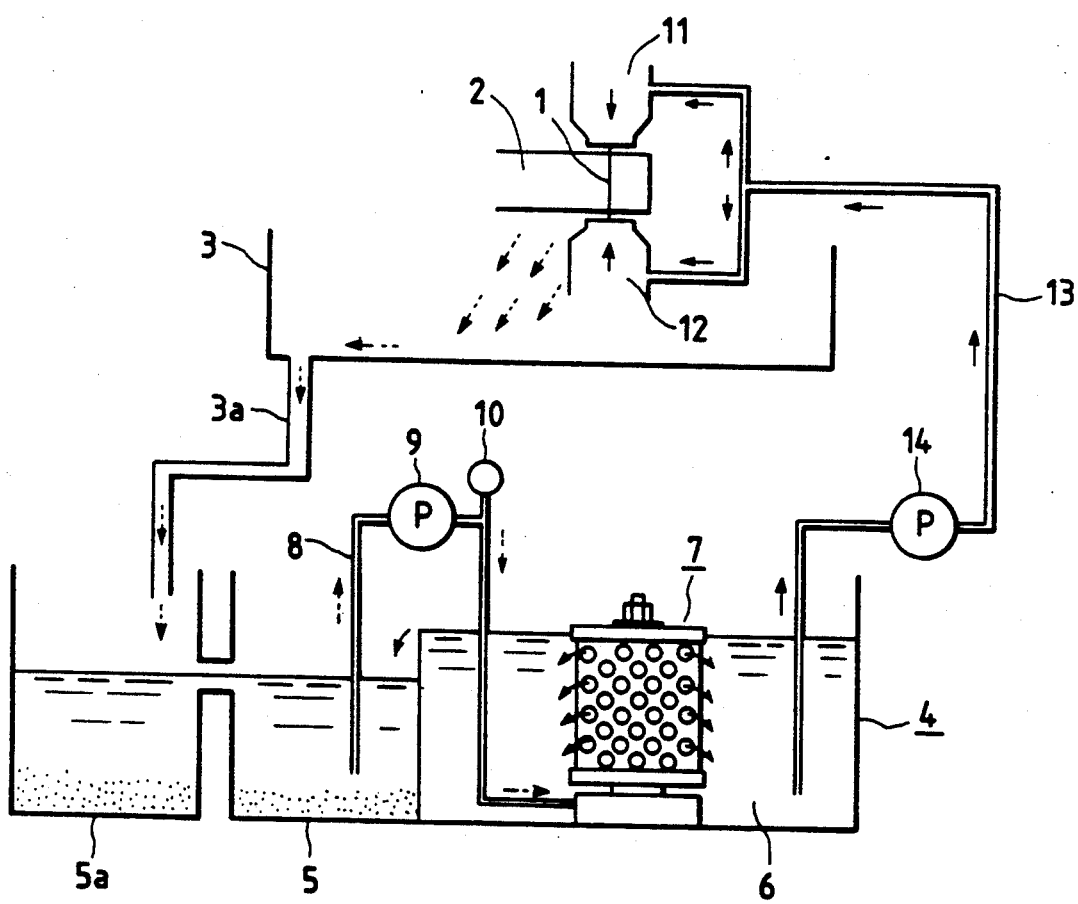
FIG. 18 is a schematic diagram showing a construction of another exemplary conventional machining solution filtration apparatus.

FIGS. 15(a) and 15(b) show a fifteenth embodiment of the invention, in which the machining solution filtration unit (4) and the filtration device (30) are the same as in the fourth embodiment (FIGS. 4(a) and 4(b)). The machining device controller (70), which has the pressure gauge (10) for monitoring the pressure of the machining solution filter (7), the filter pump (9), the supply pump (14), and the controller (56) connected thereto, and the controller (56) controls the motor (33) for driving the rewind roll (32), the blower (37), and the suction pump (49).

The contaminated solution filtration unit thus constructed normally recycles a contaminated machining solution to a clean machining solution by an operation similar to that described in the fourth embodiment (FIGS. 4(a) and 4(b)).

By the way, at an initial stage of a machining operation when the machining solution filter (7) or the filter medium (18) thereof is replaced with a new one, the filter (7) allows fine machining scraps to pass therethrough. Thus, to achieve a high-performance filtration, the filter (7) must be precoated. If the machining solution filter (7) is not precoated, the value indicated by the pressure gauge (10) is low. As a result, the machining device controller (70) that has received such value instructs the controller (56) not to select the filtration device (30) until the pressure value reaches a predetermined value, while the controller (56), upon reception of such instruction, causes the motor (33), the blower (37), and the suction pump (49) to stop their operation and allows only the machining solution filter (7) to perform the filtering operation of the contaminated machining solution. When the pressure value has reached the predetermined value as the machining solution filter (7) has been precoated sufficiently, an output signal from the pressure gauge (10) causes the machining device controller (70) to apply an operation instruction to the controller (56), allowing the motor (33), the blower (37), and the suction pump (49) to be driven so that the operation of the filtration device (30) can be started.

Although not shown in the drawings, this embodiment can be applied to any of the previously described embodiments as long as the machining solution filter (7) is provided with the machining solution filtration unit (4).

While this embodiment is applied to an electric discharge machining device in which a workpiece is machined while immersed in a machining solution, it may likewise be applied to an electric discharge machining device in which a workpiece is machined without being immersed in a machining solution.

While the embodiments applied to the wire cut electric discharge machining device have been described in detail, the application of the invention is not limited thereto, but may include other machining devices using a machining solution such as diesinking electric discharge machining devices, grinders, and ultrasonic machining devices.

While the contaminated machining solution supplied to the filtration device (30) is sucked by the blower (37) in the above embodiments, the upper surface of the filter medium (31) is covered with, e.g., a box and a machining solution may be pushed out into the box while applying a pressure thereto; in short, a difference in pressure is generated between the upper surface and lower surface of the filter medium.

As is apparent from the foregoing description, the contaminated solution filtration apparatus filters out the contaminated solution through a continuously supplied sheet-like filter medium, and causes the filter medium to entrap foreign matter in the contaminated solution, thereby allowing the contaminated solution filtration apparatus to be simple in structure, highly efficient in filtering, and easy in handling its filter medium.

If a filter is provided within the filtration unit, the contaminated solution can be filtered by the filter while stopping the filtering by the filter medium for a predetermined period of time, so that the filter can be precoated.

The detection of the presence/absence or remaining amount of the filter medium or the control of the speed of supplying the filter medium allows the filter medium to be supplied efficiently, contributing to stably filtering the contaminated solution.

The machining solution filtration apparatus for a machining device according to the invention is not only simple in structure and efficient in filtering, but also free from clogging, thereby allowing the machining device to increase its utilization.

If a filter is provided within the filtration unit, not only the life of the filter can be increased thereby to reduce the running cost, but also the filter can be precoated by filtering the contaminated solution only with the filter itself while stopping the filtration by the filter medium for a predetermined time, thereby allowing highly accurate machining to be performed in a short period of time. This contributes to reducing the frequency of replacing filters as well as improving the utilization of the machining device.

The detection of the presence/absence or remaining amount of the filter medium or the control of the speed of supplying the filter medium allows not only appropriate supply of the filter medium but also the contaminated solution to be filtered under the optimal condition, thereby contributing to reducing the running cost and improving the machining accuracy.

The contaminated machining solution can selectively be discharged directly into the contaminated machining solution. This allows the machining to be continuously performed without suspension in the event of an abnormality such as discharge of a large volume of the machining solution, shortage of the filter medium, or abnormality in the pressure difference generating means, thereby contributing to further improving the utilization of the machining device.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A contaminated solution filtration apparatus for use with a machine, comprising:

means (32, 33) for conveying a sheet-like filter medium continuously, said sheet-like filter medium comprising an upper surface and a lower surface;

means (39, 40, 41) for supplying a contaminated solution to the upper surface of said sheet-like filter medium so as to pass through said sheet-like filter medium and be filtered thereby and form a filtered solution;

means (36) for receiving the filtered solution which has passed through said sheet-like filter medium; and means (37) for generating a difference in pressure between the upper surface and the lower surface of said sheet-like filter medium, said generating means being connected to said receiving means, wherein said generating means includes a blower member (37, 37a) for sucking at least one of gases and liquids through said sheet-like filter medium (31), and further wherein said generating means further comprises:

Means for separating gases and liquids (46), said means for separating gases and liquids (46) being disposed between said receiving means (36) and said generating means (37, 37a), so that substantially no liquids enter said generating means.

2. A filtration apparatus according to claim 1, further including a second machining solution filter (7) which comprises:

double-tubularly arranged punched metals (15, 16) having a multiplicity of machining solution passing holes (17) on their sidewall surface; and an additional filter medium (18) being interposed between double-tubularly arranged punched metals, in which said contaminated solution is introduced into said additional medium (18) while being passed through the machining solution passing holes (17) of said inner punched metal (15), filtered by said additional filter medium (18), and discharged from the machining solution passing holes (17) of the outer punched metal (16).

3. A contaminated solution filtration apparatus for use with a machine, comprising:

means (32, 33) for conveying a sheet-like filter medium continuously, said sheet-like filter medium comprising an upper surface and a lower surface;

means (39, 40, 41) for supplying a contaminated solution to the upper surface of said sheet-like filter medium so as to pass through said sheet-like filter medium and be filtered thereby and form a filtered solution;

means (36) for receiving the filtered solution which has passed through said sheet-like filter medium; and means (37) for generating a difference in pressure between the upper surface and the lower surface of said sheet-like filter medium, said generating means being connected to said receiving means, further including a second machining solution filter (7) which comprises:

double-tubularly arranged inner and outer perforated metal housings (15, 16) having a multiplicity of machining solution passing holes (17) on their sidewall surface; and an additional filter medium (18) being interposed between said double-tubularly arranged inner and outer perforated metal housings, in which said contaminated solution is introduced into said additional filter medium (18) while being passed through the machining solution passing holes (17) of said inner perforated metal housing (15), filtered by said additional filter medium (18), and discharged from the machining solution passing holes (17) of the outer perforated metal housing (16).

4. A filtration apparatus according to claim 3, in which said supplying means further comprises:

a selecting means (54, 55, 56) for selecting said second machining solution filter (7) such that the contaminated solution is filtered only by said second machining solution filter for a predetermined period of time.

5. A filtration apparatus according to claim 4, in which said selecting means of said supplying means comprises:

a first electromagnetic valve (54) through which said contaminated solution is supplied to said sheet-like filter medium;

a second electromagnetic valve (55) through which said contaminated solution is supplied to said additional filter medium; and a controller (56) for controlling said first and second electromagnetic valves (54, 55).

6. A filtration apparatus according to claim 5, further comprising:

means (58, 59) for detecting a presence or an absence of said sheet-like filter medium.

7. A filtration apparatus according to claim 6, in which said means for detecting a presence of an absence comprises an optical sensor (58) and a negative pressure gauge (59) for measuring negative pressures generated by said generating means.

8. A filtration apparatus according to claim 3, further comprising:

a pressure gauge (10) for monitoring the pressure of said second machining solution filter (7);

a controller (70) connected to said pressure gauge (10) for controlling the conveying speed of said sheet-like medium (31) and for controlling said generating means and said supplying means.

9. A contaminated solution filtration apparatus for use with a machine, comprising:

means (32, 33) for conveying a sheet-like filter medium continuously, said sheet-like filter medium comprising an upper surface and a lower surface;

means (39, 40, 41) for supplying a contaminated solution to the upper surface of said sheet-like filter medium so as to pass through said sheet-like filter medium and be filtered thereby and form a filtered solution;

means (36) for receiving the filtered solution which has passed through said sheet-like filter medium; and means (37) for generating a difference in pressure between the upper surface and the lower surface of said sheet-like filter medium, said generating means being connected to said receiving means, further comprising:

condition responsive means (56, 58, 59, 65, 66a, 66b) for automatically detecting a presence or an absence of said sheet-like filter medium over said means for receiving.

10. A filtration apparatus according to claim 9, in which said means for automatically detecting a presence or an absence comprises an optical sensor (58) and a negative pressure gauge (59) for measuring negative pressures generated by said generating means.

11. A filtration apparatus according to claim 9, in which said means for automatically detecting a presence or an absence comprises:

a pair of rollers (66a, 66b), made of an electroconductive material, disposed so as to confront each other while interposing said sheet-like filter medium (31) therebetween, and in which said rollers are insulated when said sheet-like filter medium (31) is present therebetween and are brought into conduction when said sheet-like filter medium (31) is absent therebetween.

12. A filtration apparatus according to claim 11, further including:

means for displaying a remaining amount of said sheet-like filter medium to be conveyed comprising an encoder (61) mounted on one of said rollers of said means for automatically detecting a presence of an absence, a counter (62) connected to said encoder, and a display unit (63) for displaying an amount of the remaining portion of said sheet-like filter medium.

13. A contaminated solution filtration apparatus for use with a machine, comprising:

means (32, 33) for conveying a sheet-like filter medium continuously, said sheet-like filter medium comprising an upper surface and a lower surface;

means (39, 40, 41) for supplying a contaminated solution to the upper surface of said sheet-like filter medium so as to pass through said sheet-like filter medium and be filtered thereby and form a filtered solution;

means (36) for receiving the filtered solution which has passed through said sheet-like filter medium; and means (37) for generating a difference in pressure between the upper surface and the lower surface of said sheet-like filter medium, said generating means being connected to said receiving means, further comprising:

condition responsive means (61,62) for automatically detecting a total amount of said sheet-like filter medium which remains to be conveyed.

14. A filtration apparatus according to claim 13 in which said remaining amount detecting means includes an encoder (61) mounted on said conveying means and a counter (62) connected to said encoder.

15. A filtration apparatus according to claim 13, further comprising:

means (63) for displaying said remaining amount of said sheet-like filter medium (31), said displaying means being connected to said detecting means.

16. A filtration apparatus according to claim 13, further comprising an alarm (68) which is turned on when said remaining amount detecting means detects that the remaining amount of said sheet-like filter medium is smaller than a predetermined value.

17. A contaminated solution filtration apparatus for use with a machine, comprising:

means (32, 33) for conveying a sheet-like filter medium continuously, said sheet-like filter medium comprising an upper surface and a lower surface;

means (39, 40, 41) for supplying a contaminated solution to the upper surface of said sheet-like filter medium so as to pass through said sheet-like filter medium and be filtered thereby and form a filtered solution;

means (36) for receiving the filtered solution which has passed through said sheet-like filter medium; and means (37) for generating a difference in pressure between the upper surface and the lower surface of said sheet-like filter medium, said generating means being connected to said receiving means, wherein said conveying means includes a variable-speed motor (33, 33a) and an automatic controller means (56, 70) for controlling a conveying speed of said sheet-like filter medium (31).

18. A filtration apparatus according to claim 17, in which said controller means includes a programmed-instruction and said conveying speed of said sheet-like filter medium depends on said programmed-instruction from said controller (70).

19. A filtration apparatus according to claim 17, in which said conveying means further comprising:

an optical sensor (65) for detecting the degree of contamination of said solution, in which said conveying speed of said sheet-like filter medium is controlled by said controller means (56, 70) connected to said optical sensor.

20. A filtration apparatus according to claim 19, in which said optical sensor (65) is provided within said supplying means.

21. A filtration apparatus according to claim 19, in which said optical sensor (65) is provided within said receiving means.

22. A filtration apparatus according to claim 17, further comprising a negative pressure gauge (72) for measuring a negative pressure within said receiving means (36) and issuing an output, in which the output of said negative pressure gauge (72) is applied to said controller means (56) so as to control the conveying speed of said sheet-like filter medium (31).

* * * * *